US012754905B2

(12) United States Patent
Seguin et al.

(10) Patent No.: US 12,754,905 B2
(45) **Date of Patent: *Oct. 6, 2026**

(54) METHOD AND SYSTEM FOR ASSOCIATING A LICENSE PLATE NUMBER WITH A USER

(71) Applicant: GENETEC INC., Saint-Laurent (CA)

(72) Inventors: François Seguin, Longueuil (CA); Sean Lawlor, Dollard-des-Ormeaux (CA)

(73) Assignee: GENETEC INC., St-Laurent (CA)

( * ) Notice: Subject to any disclaimer, the term of this patent is extended or adjusted under 35 U.S.C. 154(b) by 0 days.

This patent is subject to a terminal disclaimer.

(21) Appl. No.: 19/170,787

(22) Filed: Apr. 4, 2025

(65) Prior Publication Data

US 2025/0291791 A1 Sep. 18, 2025

Related U.S. Application Data

(63) Continuation of application No. 18/330,497, filed on Jun. 7, 2023, now Pat. No. 12,277,114, which is a continuation of application No. 16/670,407, filed on Oct. 31, 2019, now Pat. No. 11,709,828.

(51) Int. Cl.

| | |
|---|---|
| ***G06F 16/245*** | (2019.01) |
| ***G06F 16/2458*** | (2019.01) |
| *G06V 20/52* | (2022.01) |
| *G06V 20/62* | (2022.01) |

(52) U.S. Cl.

CPC ........ *G06F 16/245* (2019.01); *G06F 16/2477* (2019.01); *G06V 20/52* (2022.01); *G06V 20/625* (2022.01)

(58) Field of Classification Search

CPC ............... G06F 16/245; G06F 16/2468; G06F 16/2477; G06V 20/52; G06V 20/625

See application file for complete search history.

(56) References Cited

U.S. PATENT DOCUMENTS

| | | | | |
|---|---|---|---|---|
| 11,004,111 | B2 * | 5/2021 | Polehn | G06Q 30/0251 |
| 2004/0233036 | A1 * | 11/2004 | Sefton | G07B 15/04 340/5.53 |

(Continued)

FOREIGN PATENT DOCUMENTS

| | | | | |
|---|---|---|---|---|
| CN | 107269054 A | * 10/2017 | | E04H 6/08 |
| WO | WO-2008148022 A2 | * 12/2008 | | G01S 1/7034 |
| WO | WO-2020014311 A1 | * 1/2020 | | G07C 9/37 |

*Primary Examiner* — James E Richardson

(74) *Attorney, Agent, or Firm* — NORTON ROSE FULBRIGHT CANADA LLP

(57) ABSTRACT

Methods and systems for determining at least one candidate user for a license plate number (LPN) are described herein. A set of license plate recognition (LPR) events that correspond to the LPN and a set of access events of a plurality of users may be obtained. One or more associated events for each respective user of the plurality of users may be determined. A confidence score for each respective user may be determined based on the one or more associated events for the respective user. At least one candidate user for the LPN may be identified based on the confidence score. An indication that the at least one candidate user is a candidate for the LPN is output. Methods and systems for determining at least one candidate license plate number for a user are also described herein. Additional related methods and systems are described herein.

21 Claims, 16 Drawing Sheets

(56) References Cited

U.S. PATENT DOCUMENTS

| | | | | |
|---|---|---|---|---|
| 2007/0291118 | A1* | 12/2007 | Shu | H04N 7/18<br>348/E7.085 |
| 2008/0273088 | A1* | 11/2008 | Shu | H04N 7/18<br>340/541 |
| 2014/0254866 | A1* | 9/2014 | Jankowski | G08G 1/0175<br>382/103 |
| 2014/0270383 | A1* | 9/2014 | Pederson | G08G 1/207<br>382/104 |
| 2016/0232565 | A1* | 8/2016 | Goergen | G06Q 10/20 |
| 2019/0370562 | A1* | 12/2019 | Yigit | G06V 20/46 |
| 2020/0410251 | A1* | 12/2020 | Petrey, Jr. | G08B 7/06 |
| 2024/0331393 | A1* | 10/2024 | Petrey, Jr. | G08B 27/003 |

* cited by examiner

A

| User Identifier | Timestamp | Type |
|---|---|---|
| Alice | 2019-05-03-08:30:15 | Entry |
| Bob | 2019-05-03-08:45:27 | Entry |
| Charlie | 2019-05-03-09:05:03 | Entry |
| Charlie | 2019-05-03-04:31:27 | Exit |
| Alice | 2019-05-03-05:00:45 | Exit |
| Bob | 2019-05-03-05:15:55 | Exit |

•••

P

| License Plate Number | Timestamp | Type |
|---|---|---|
| ABC001 | 2019-05-03-08:27:12 | Entry |
| ABC002 | 2019-05-03-08:39:25 | Entry |
| ABC003 | 2019-05-03-09:00:01 | Entry |
| ABC003 | 2019-05-03-04:33:55 | Exit |
| ABC001 | 2019-05-03-05:03:32 | Exit |
| ABC002 | 2019-05-03-05:20:07 | Exit |

•••

FIGURE 2

METHOD AND SYSTEM FOR ASSOCIATING A LICENSE PLATE NUMBER WITH A USER

CROSS-REFERENCE TO RELATED APPLICATIONS

The present application is a continuation of U.S. patent application Ser. No. 18/330,497 filed on Jun. 7, 2023, which is a continuation of U.S. application Ser. No. 16/670,407 filed Oct. 31, 2019, granted as U.S. Pat. No. 11,709,828, the entire contents of which are incorporated herein by reference.

TECHNICAL FIELD

The present disclosure relates generally to computer-implemented methods and systems for associating two types of identification events with each other, and, more particularly to computer-implemented methods and systems for associating one or more license plate numbers to one or more users.

BACKGROUND OF THE ART

Organizations may want to identify owners of vehicles parked in parking lots. For example, a company may want to identify the employee of a vehicle when a parking violation occurs. The company may maintain a register of license plate numbers of employees that park in the company's parking lot. For instance, each time a new employee joins the company, the register may be updated to include that employee's license plate number. However, the register may not be a reliable record as some employees may not provide a license plate number and/or employees may forget to update the register when they get a new vehicle with a different license plate number. Associating other types of identification events to each other may have similar deficiencies.

As such, there is a need to be able to associate two types of identification events with each other, such as to be able to identify an owner of a vehicle in a parking lot without the use of a register of vehicle owners.

SUMMARY

The present disclosure is drawn to systems and methods for associating two types of identification event with each other, for example, such as one or more license plate numbers with one or more users.

In one aspect, there is provided a computer-implemented method. The method comprises: receiving, at a computing device, a query comprising a license plate number; obtaining, at the computing device, a set of license plate recognition events that correspond to the license plate number and a set of access events of a plurality of users; determining, at the computing device, one or more associated events for each respective user from at least a subset of the plurality of users based on one or more access events in the set of access events for the respective user that occur around the set of license plate recognition events; determining, at the computing device, a confidence score for each respective user based on the one or more associated events for the respective user; identifying, at the computing device, at least one candidate user for the license plate number based at least in part on the confidence score of the at least one candidate user; and outputting, by the computing device, an indication that the at least one candidate user is a candidate for the license plate number for presentation on a display device.

In another aspect, there is provided a computing device comprising: a processing unit; and a non-transitory computer-readable memory. The non-transitory computer-readable memory having stored thereon program instructions executable by the processing unit for: receiving a query comprising a license plate number; obtaining a set of license plate recognition events that correspond to the license plate number and a set of access events of a plurality of users; determining one or more associated events for each respective user from at least a subset of the plurality of users based on one or more access events in the set of access events for the respective user that occur around the set of license plate recognition events; determining a confidence score for each respective user based on the one or more associated events for the respective user; identifying at least one candidate user for the license plate number based at least in part on the confidence score of the at least one candidate user; and outputting an indication that the at least one candidate user is a candidate for the license plate number for presentation on a display device.

In a further aspect, there is provided a non-transitory computer-readable medium having stored thereon program instructions executable by a processing unit for: receiving, at a computing device, a query comprising a license plate number; obtaining, at the computing device, a set of license plate recognition events that correspond to the license plate number and a set of access events of a plurality of users; determining, at the computing device, one or more associated events for each respective user from at least a subset of the plurality of users based on one or more access events in the set of access events for the respective user that occur around the set of license plate recognition events; determining, at the computing device, a confidence score for each respective user based on the one or more associated events for the respective user; identifying, at the computing device, at least one candidate user for the license plate number based at least in part on the confidence score of the at least one candidate user; and outputting, by the computing device, an indication that the at least one candidate user is a candidate for the license plate number for presentation on a display device.

In some embodiments, each of the one or more associated events for the respective user corresponds to a given license plate recognition event in the set of license plate recognition events that has a corresponding access event in the set of access events for the respective user that occurs in a time window of the given license plate recognition event.

In some embodiments, determining the confidence score comprises: calculating a relative frequency for each respective user by dividing an amount of the one or more associated events for the respective user by a total number of license plate recognition events in the set of license plate recognition events; and calculating the confidence score for each respective user based on the relative frequency for the respective user.

In some embodiments, determining the confidence score comprises: determining a set of time differences between the one or more associated events for each respective user; and calculating the confidence score for each respective user based on the relative frequency for the respective user and the set of time differences for the respective user.

In some embodiments, determining the set of time differences comprises: for each license plate recognition in the set of license plate recognition events: obtaining a license plate recognition event timestamp; and for each access event in the set of access events corresponding to the respective user that occurs in the time window of the license plate recognition event timestamp: obtaining an access event timestamp; and adding a difference in time between the license plate recognition event timestamp and the access event timestamp to the set of time differences.

In some embodiments, determining the confidence score comprises: calculating a variance of the set of time differences for each respective user; and calculating the confidence score for each respective user based on the relative frequency for the respective user and the variance for the respective user.

In some embodiments, the variance for each respective user is determined as a weighted average over a plurality of periods of time of a day.

In some embodiments, the variances is a normalized variance having a value between zero (0) and one (1).

In some embodiments, the confidence score for each respective user is determined as a product of the relative frequency for the respective user and the variance for the respective user.

In some embodiments, determining the confidence score comprises: calculating a statistical parameter of a set of time differences between the one or more associated events for each respective user; and calculating the confidence score for each respective user based on the statistical parameter for the respective user. In some embodiments, the statistical parameter is variance or standard deviation.

In one aspect, there is provided a computer-implemented method. The method comprise: receiving, at a computing device, a query comprising an identifier of a user; obtaining, at the computing device, a set of access events of the user based on the identifier and a set of license plate recognition events of a plurality of license plate numbers; determining, at the computing device, one or more associated events for each respective license plate number from at least a subset of the plurality of license plate numbers based on one or more license plate recognition events in the set of license plate recognition events for the respective license plate number that occur around the set of access events; determining, at the computing device, a confidence score for each respective license plate number based on the one or more associated events for the respective license plate number; identifying, at the computing device, at least one candidate license plate number for the user based at least in part on the confidence score of the at least one candidate license plate number; and outputting, by the computing device, an indication that the at least one candidate license plate number is a candidate for the user for presentation on a display device.

In another aspect, there is provided a computing device comprising: a processing unit; and a non-transitory computer-readable memory. The non-transitory computer-readable memory having stored thereon program instructions executable by the processing unit for: receiving a query comprising an identifier of a user; obtaining a set of access events of the user based on the identifier and a set of license plate recognition events of a plurality of license plate numbers; determining one or more associated events for each respective license plate number from at least a subset of the plurality of license plate numbers based on one or more license plate recognition events in the set of license plate recognition events for the respective license plate number that occur around the set of access events; determining a confidence score for each respective license plate number based on the one or more associated events for the respective license plate number; identifying at least one candidate license plate number for the user based at least in part on the confidence score of the at least one candidate license plate number; and outputting an indication that the at least one candidate license plate number is a candidate for the user for presentation on a display device.

In a further aspect, there is provided a non-transitory computer-readable medium having stored thereon program instructions executable by a processing unit for: receiving, at a computing device, a query comprising an identifier of a user; obtaining, at the computing device, a set of access events of the user based on the identifier and a set of license plate recognition events of a plurality of license plate numbers; determining, at the computing device, one or more associated events for each respective license plate number from at least a subset of the plurality of license plate numbers based on one or more license plate recognition events in the set of license plate recognition events for the respective license plate number that occur around the set of access events; determining, at the computing device, a confidence score for each respective license plate number based on the one or more associated events for the respective license plate number; identifying, at the computing device, at least one candidate license plate number for the user based at least in part on the confidence score of the at least one candidate license plate number; and outputting, by the computing device, an indication that the at least one candidate license plate number is a candidate for the user for presentation on a display device.

In some embodiments, each of the one or more associated events for the respective license plate number corresponds to a given license plate recognition event in the set of license plate recognition events corresponding to the license plate number that occurs in a time window of a corresponding access event of the user in the set of access events.

In some embodiments, determining the confidence score comprises: calculating a relative frequency for each respective license plate number by dividing an amount of the one or more associated events for the respective license plate number by a total number of license plate recognition events in the set of license plate recognition events that correspond to the respective license plate number; and calculating the confidence score for each respective license plate number based on the relative frequency for the respective user.

In some embodiments, determining the confidence score comprises: determining a set of time differences between the one or more associated events for each respective license plate number; and calculating the confidence score for each respective license plate number based on the relative frequency for the respective license plate number and the set of time differences for the respective license plate number.

In some embodiments, determining the set of time differences comprises: for each license plate recognition in the set of license plate recognition events: obtaining a license plate recognition event timestamp; and for each access event in the set of access events that occurs in the time window of the license plate recognition event timestamp: obtaining an access event timestamp; and adding a difference in time between the license plate recognition event timestamp and the access event timestamp to the set of time differences.

In some embodiments, determining the confidence score comprises: calculating a variance of the set of time differences for each respective license plate number; and calculating the confidence score for each respective license plate number based on the relative frequency for the respective license plate number and the variance for the respective license plate number.

In some embodiments, the variance for each respective license plate number is determined as a weighted average over a plurality of periods of time of a day.

In some embodiments, the variances is a normalized variance having a value between zero (0) and one (1).

In some embodiments, the confidence score for each respective license plate number is determined as a product of the relative frequency for the respective license plate number and the variance for the respective license plate number.

In some embodiments, determining the confidence score comprises: calculating a statistical parameter of a set of time differences between the one or more associated events for each respective license plate number; and calculating the confidence score for each respective license plate number based on the statistical parameter for the respective license plate number. In some embodiments, the statistical parameter is variance or standard deviation.

In one aspect, there is provided a computer-implemented method. The method comprise: receiving, at a computing device, a query comprising a parameter of a first identifier type for determining at least one candidate of a second identifier type; obtaining, at the computing device, a first set of events of the first identifier type based on the parameter and a second set of events of the second identifier type; determining, at the computing device, one or more associated events for each respective identifier from at least a subset of a plurality of unique identifiers of the second set based on one or more events in the second set of events for the respective identifier that occur around the first set of events; determining, at the computing device, a confidence score for each respective unique identifier based on the one or more associated events for the respective unique identifier; identifying, at the computing device, at least one candidate for the parameter based at least in part on the confidence score of the at least one candidate; and outputting, by the computing device, an indication that the at least one candidate is associated to the parameter for presentation on a display device.

In another aspect, there is provided a computing device comprising: a processing unit; and a non-transitory computer-readable memory. The non-transitory computer-readable memory having stored thereon program instructions executable by the processing unit for: receiving a query comprising a parameter of a first identifier type for determining at least one candidate of a second identifier type; obtaining a first set of events of the first identifier type based on the parameter and a second set of events of the second identifier type; determining one or more associated events for each respective identifier from at least a subset of a plurality of unique identifiers of the second set based on one or more events in the second set of events for the respective identifier that occur around the first set of events; determining a confidence score for each respective unique identifier based on the one or more associated events for the respective unique identifier; identifying at least one candidate for the parameter based at least in part on the confidence score of the at least one candidate; and outputting an indication that the at least one candidate is associated to the parameter for presentation on a display device.

In a further aspect, there is provided a non-transitory computer-readable medium having stored thereon program instructions executable by a processing unit for: receiving, at a computing device, a query comprising a parameter of a first identifier type for determining at least one candidate of a second identifier type; obtaining, at the computing device, a first set of events of the first identifier type based on the parameter and a second set of events of the second identifier type; determining, at the computing device, one or more associated events for each respective identifier from at least a subset of a plurality of unique identifiers of the second set based on one or more events in the second set of events for the respective identifier that occur around the first set of events; determining, at the computing device, a confidence score for each respective unique identifier based on the one or more associated events for the respective unique identifier; identifying, at the computing device, at least one candidate for the parameter based at least in part on the confidence score of the at least one candidate; and outputting, by the computing device, an indication that the at least one candidate is associated to the parameter for presentation on a display device.

In some embodiments, each of the one or more associated events for the respective unique identifier corresponds to a given event in the first set that has a corresponding event in the second set that occurs in a time window of the given event.

In some embodiments, determining the confidence score comprises: calculating a relative frequency for each unique identifier by dividing an amount of the one or more associated events for the respective unique identifier by a total number of events in the first set of events; and calculating the confidence score for each respective unique identifier based on the relative frequency for the unique identifier.

In some embodiments, determining the confidence score comprises: determining a set of time differences between the one or more associated events for each respective unique identifier; and calculating the confidence score for each respective unique identifier based on the relative frequency for the respective unique identifier and the set of time differences for the respective unique identifier.

In some embodiments, determining the confidence score comprises: calculating a variance of the set of time differences for each respective unique identifier; and calculating the confidence score for each respective unique identifier based on the relative frequency for the respective unique identifier and the variance for the respective unique identifier.

In some embodiments, the variance for each respective unique identifier is determined as a weighted average over a plurality of periods of time of a day.

In some embodiments, the variances is a normalized variance having a value between zero (0) and one (1).

In some embodiments, the confidence score for each respective unique identifier is determined as a product of the relative frequency for the respective unique identifier and the variance for the respective unique identifier.

In one aspect, there is provided a computer-implemented method. The method comprises: receiving, at a computing device, a query comprising a license plate number; obtaining, at the computing device, a set of license plate recognition events that correspond to the license plate number and a set of access events of a plurality of users; determining, at the computing device, a confidence score for each respective user from at least a subset of the plurality of users based on a statistical correlation between access events for the respective user in the set of access events and license plate recognition events in the set of license plate recognition events; identifying, at the computing device, at least one candidate user for the license plate number based at least in part on the confidence score; and outputting, by the computing device, an indication that the at least one candidate user is a candidate for the license plate number for presentation on a display device.

In another aspect, there is provided a computing device comprising: a processing unit; and a non-transitory computer-readable memory. The non-transitory computer-readable memory having stored thereon program instructions executable by the processing unit for: receiving a query comprising a license plate number; obtaining a set of license plate recognition events that correspond to the license plate number and a set of access events of a plurality of users; determining a confidence score for each respective user from at least a subset of the plurality of users based on a statistical correlation between access events for the respective user in the set of access events and license plate recognition events in the set of license plate recognition events; identifying at least one candidate user for the license plate number based at least in part on the confidence score; and outputting an indication that the at least one candidate user is a candidate for the license plate number for presentation on a display device.

In a further aspect, there is provided a non-transitory computer-readable medium having stored thereon program instructions executable by a processing unit for: receiving, at a computing device, a query comprising a license plate number; obtaining, at the computing device, a set of license plate recognition events that correspond to the license plate number and a set of access events of a plurality of users; determining, at the computing device, a confidence score for each respective user from at least a subset of the plurality of users based on a statistical correlation between access events for the respective user in the set of access events and license plate recognition events in the set of license plate recognition events; identifying, at the computing device, at least one candidate user for the license plate number based at least in part on the confidence score; and outputting, by the computing device, an indication that the at least one candidate user is a candidate for the license plate number for presentation on a display device.

In some embodiments, determining the confidence score for each respective user comprises calculating the confidence score for each respective user based on proximity in time between the access events for the respective user and the at least some license plate recognition events.

In some embodiments, determining the confidence score for each respective user comprises calculating the confidence score for each respective user based on a measure of variability between the access events for the respective user and the at least some license plate recognition events.

In some embodiments, determining the confidence score for each respective user comprises calculating the confidence score for each respective user based on a variance between the access events for the respective user and the at least some license plate recognition events.

In one aspect, there is provided a computer-implemented method. The method comprises: receiving, at a computing device, a query comprising an identifier of a user; obtaining, at the computing device, a set of access events of the user based on the identifier and a set of license plate recognition events of a plurality of license plate numbers; determining, at the computing device, a confidence score for each respective license plate number from at least a subset of the plurality of license plate numbers based on a statistical correlation between license plate recognition events for the respective license plate number in the set of license plate recognition events and at least some access events in the set of access events; identifying, at the computing device, at least one candidate license plate number for the user based at least in part on the confidence score of the at least one candidate license plate number; and outputting, by the computing device, an indication that the at least one candidate license plate number is a candidate for the user for presentation on a display device.

In another aspect, there is provided a computing device comprising: a processing unit; and a non-transitory computer-readable memory. The non-transitory computer-readable memory having stored thereon program instructions executable by the processing unit for: receiving a query comprising an identifier of a user; obtaining a set of access events of the user based on the identifier and a set of license plate recognition events of a plurality of license plate numbers; determining a confidence score for each respective license plate number from at least a subset of the plurality of license plate numbers based on a statistical correlation between license plate recognition events for the respective license plate number in the set of license plate recognition events and at least some access events in the set of access events; identifying at least one candidate license plate number for the user based at least in part on the confidence score of the at least one candidate license plate number; and outputting an indication that the at least one candidate license plate number is a candidate for the user for presentation on a display device.

In a further aspect, there is provided a non-transitory computer-readable medium having stored thereon program instructions executable by a processing unit for: receiving, at a computing device, a query comprising an identifier of a user; obtaining, at the computing device, a set of access events of the user based on the identifier and a set of license plate recognition events of a plurality of license plate numbers; determining, at the computing device, a confidence score for each respective license plate number from at least a subset of the plurality of license plate numbers based on a statistical correlation between license plate recognition events for the respective license plate number in the set of license plate recognition events and at least some access events in the set of access events; identifying, at the computing device, at least one candidate license plate number for the user based at least in part on the confidence score of the at least one candidate license plate number; and outputting, by the computing device, an indication that the at least one candidate license plate number is a candidate for the user for presentation on a display device.

In some embodiments, determining the confidence score for each respective license plate number comprises calculating the confidence score for each respective license plate number based on proximity in time between the license plate recognition events for the respective license plate number and the at least some access events.

In some embodiments, determining the confidence score for each respective license plate number comprises calculating the confidence score for each respective license plate number based on a measure of variability between the license plate recognition events for the respective license plate number and the at least some access events.

In some embodiments, determining the confidence score for each respective license plate number comprises calculating the confidence score for each respective license plate number based on a variance between the license plate recognition events for the respective license plate number and the at least some access events.

In one aspect, there is provided a computer-implemented method. The method comprises: receiving, at a computing device, a query comprising a license plate number; obtaining, at the computing device, a set of license plate recognition events that correspond to the license plate number and a set of access events of a plurality of users; determining, at the computing device, a confidence score for each respective user from at least a subset of the plurality of users based on one or more associations between access events for the respective user in the set of access events and license plate recognition events in the set of license plate recognition events; identifying, at the computing device, at least one candidate user for the license plate number based at least in part on the confidence score; and outputting, by the computing device, an indication that the at least one candidate user is a candidate for the license plate number for presentation on a display device. The aforementioned method may be implemented with a computing device comprising a processing unit and a non-transitory computer-readable memory having stored thereon program instructions executable by the processing unit for performing the method. The aforementioned method may be implemented with a non-transitory computer-readable medium having stored thereon program instructions executable by a processing unit for performing the method.

In one aspect, there is provided a computer-implemented method. The method comprises: receiving, at a computing device, a query comprising an identifier of a user; obtaining, at the computing device, a set of access events of the user based on the identifier and a set of license plate recognition events of a plurality of license plate numbers; determining, at the computing device, a confidence score for each respective license plate number from at least a subset of the plurality of license plate numbers based on one or more associations between license plate recognition events for the respective license plate number in the set of license plate recognition events and at least some access events in the set of access events; identifying, at the computing device, at least one candidate license plate number for the user based at least in part on the confidence score of the at least one candidate license plate number; and outputting, by the computing device, an indication that the at least one candidate license plate number is a candidate for the user for presentation on a display device. The aforementioned method may be implemented with a computing device comprising a processing unit and a non-transitory computer-readable memory having stored thereon program instructions executable by the processing unit for performing the method. The aforementioned method may be implemented with a non-transitory computer-readable medium having stored thereon program instructions executable by a processing unit for performing the method.

DESCRIPTION OF THE DRAWINGS

Reference is now made to the accompanying figures in which:

FIG. 2 illustrates example tables of user access data and license plate recognition data, in accordance with one or more embodiments;

It will be noted that throughout the appended drawings, like features are identified by like reference numerals.

DETAILED DESCRIPTION

Figure 1:
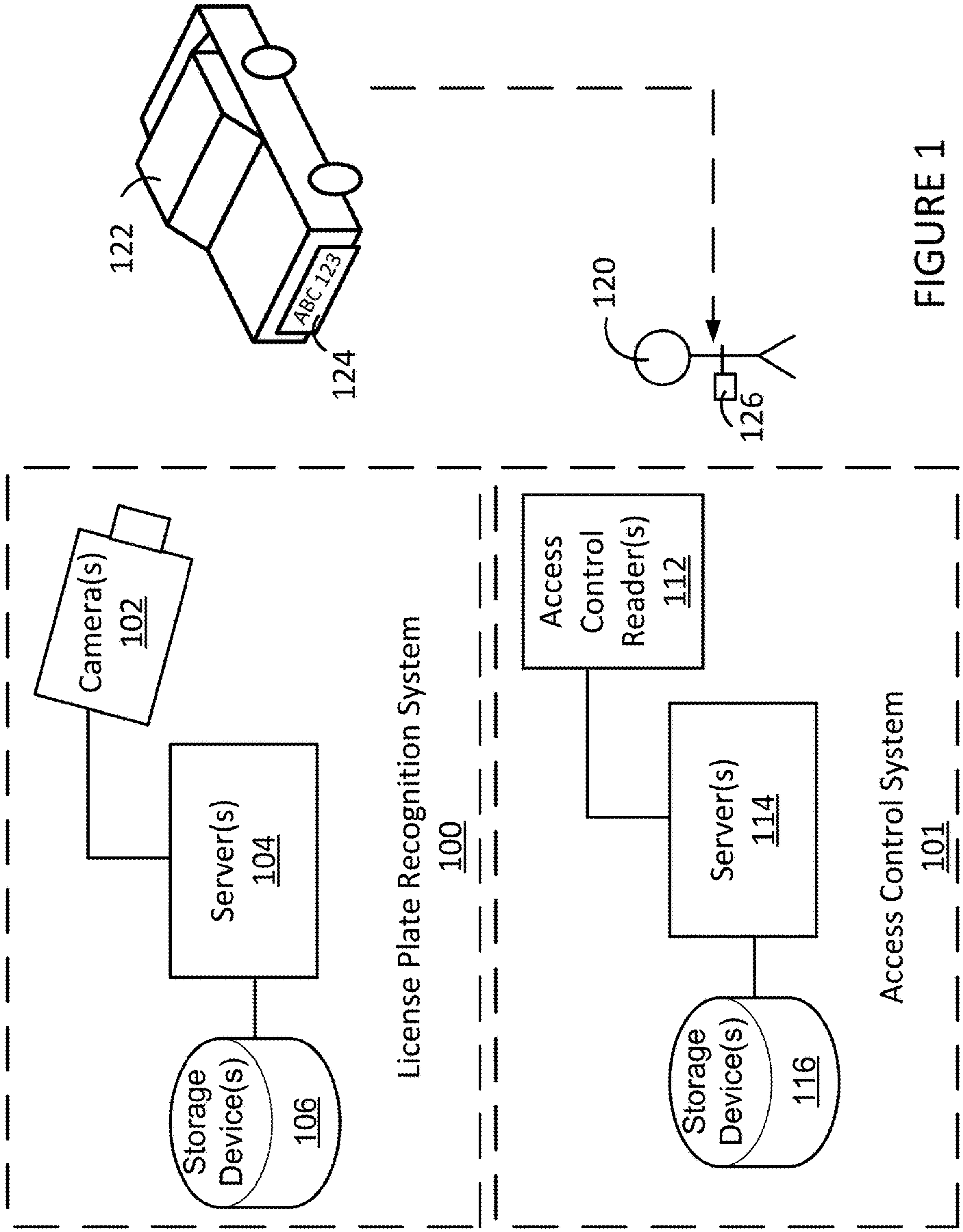
FIG. 1 is a schematic diagram of an example license plate recognition system and an access control system, in accordance with one or more embodiments.

With reference to FIG. 1, there is illustrated an example license plate recognition (LPR) system 100 and an example access control system 101. The LPR system 100 comprises one or more cameras 102 that may be used to capture images of license plates of vehicles entering and/or exiting an area, such as a parking lot. The images captured by the camera(s) 102 may be provided to one or more servers 104. The server(s) 104 may preform image analysis on the captured images to identify the licence plate number associated with each image. Alternatively, the camera 102 may comprises one or more computing devices for performing image analysis to identify the license plate number of a captured image. A record for each LPR event may be generated at the server 104 and/or the camera 102. The records may comprise any of an optical character recognition (OCR) interpretation of the captured license plate image (e.g., license plate number in a text format), images of the license plate number, a perspective image of the vehicle associated with the license plate number, a timestamp of the date and time of the LPR event, the location of the camera 102 that captured the image (e.g., entry of parking lot, exit of parking lot, GPS position, etc.), the type of event (e.g., an entry or an exit of a parking lot), and/or any other suitable information. Records of the LPR events may be stored as LPR data in one or more storage devices 106. The LPR data may be referenced with the reference character "P".

The access control system 101 comprises one or more access control readers 112 that may be used to read access devices of users in order to grant access to users entering and/or exit of a secure area, such as a building or an area of a building. The access devices may be electronic access cards, FOBs (i.e., key fobs), RFID devices, bands, badges, smart card, or any other suitable device. When a given access control reader 112 reads a given access device of a given user, the data read by the access control reader(s) 112 may be provided to one or more servers 114. The server(s) 114 may compare the data provided by the reader 112 to its records to determine to grant or deny access to the users. Alternatively, the access control reader 112 may comprise one or more computing devices for comparing the data obtained from the access device to records at the access control reader 112 in order to grant or deny access. A record for each access event may be generated at the server 114 and/or the access control reader 112. The record may include a timestamp of the date and time of the access event, the location of the reader 112 that read the access device (e.g., entry of building, exit of building, GPS position, etc.), the type of access control event (e.g., an entry or an exit of a building) and/or any other suitable information. Records of the access events may be stored as user access data in one or more storage devices 116. The user access data may be referenced with the reference character "A".

While the LPR system 100 and the access control system 101 are illustrated as separate systems, this is for example purposes only. In some embodiments, the LPR system 100 and the access control system 101 may be the same system and/or may share one or more common components. For example, the camera(s) 102 and the access control reader(s) 112 may be connected to a common server 104 or 114. By way of another example, one or more common storage devices 106 or 116 connected to the server(s) 104 and/or 114 may be used to store both the LPR data and the user access data. The server(s) 104, 114 may be any suitable computing device(s), such as one or more computers, a server clusters, a mainframe, a computing cluster, a cloud computing system, a distributed computing system, a portable computing device, or the like. The server(s) 104 and/or 114 is/are configured to communicate with the camera(s) 102 and/or the access control reader(s) 112. The camera(s) and/or the access control reader(s) 112 may communicate with the server(s) 104 and/or 114 by use of one or more wires and/or by wireless communication. The camera(s) 102 and/or the access control reader(s) 112 may communicate with the server(s) 104 and/or 114 using one or more networks. The network(s) may comprise one or more public networks (e.g., the Internet) and/or one or more private networks. The network(s) may comprise one or more of a personal area network (PAN), local area network (LAN), mesh network, metropolitan area network (MAN), wide area network (WAN), wireless network, Wi-Fi network, cellular network and/or any other suitable network(s). The storage device(s) 106, 116 may be any suitable storage device, such as for example, one or more hard drives, flash media, memory devices or the like. The storage device(s) 106 and/or 116 may be separate or part of the server(s) 104 and/or 114. The LPR system 100 and the access control system 101 may vary depending on practical implementations.

By way of a specific and non-limiting example, a given user 120 enters a parking lot with his vehicle 122. The license plate number 124 of the vehicle 122 is obtained by the LPR system 100. An LPR event is stored, which comprises the license plate number 124, the timestamp of the LPR event, and that the LRP event is an "entry". The user 120 then proceeds to enter a building by passing through an access point having an access control reader 108 using his access device 126. The access control system 101 grants the user 120 access to the building. An access event is stored, which comprises at least one identifier of the user 120 (e.g., an identification number, the user's name, and/or the like), the timestamp of the access event, and that the access event is an "entry". The user 120 may exit the building at a later time using his access device 126 and exit the parking lot with his vehicle 122. Another access event is stored, which comprises the at least one identifier of the user 120, the timestamp of the access event, and that the access event is an "exit" and another LPR event is stored, which comprises the license plate number 124, the timestamp of the LPR event, and that the LRP event is an "exit". The user 120 may repeat this process of entering and exiting the parking lot with his vehicle 122 on a regular basis, such as, for example, every week day, or irregularly. Similarly, the user 120 may repeat this process of entering and exiting the building with his access device 126 on a regular or irregularly basis. The user 120 may enter and/or exit the building using the access device 126 without exiting the parking lot, and the access events would accordingly be recorded. Other users may follow a similar process. Accordingly, LPR events for different vehicles and access events for different users over a period of time may be recorded. The LPR data P comprising the LPR events and user access data A comprising the access events may be captured and stored in any suitable manner.

With reference to FIG. 2, a specific and non-limiting example of the user access data A and the LPR data P is illustrated. As illustrated, the user access data A has a plurality of access event for each user identifier and a corresponding timestamp and access type (e.g., entry or exit). Similarly, the LPR data P has plurality of LPR events for each license plate number and a corresponding timestamp and access type (e.g., entry or exit). The user access data A and the LPR data P may vary depending on practical implementations. For example, in some embodiments, the user access data A and/or the LPR data P may not comprise records of the access type. The user access data A and the LPR data P may comprise any other suitable information.

Figure 3:
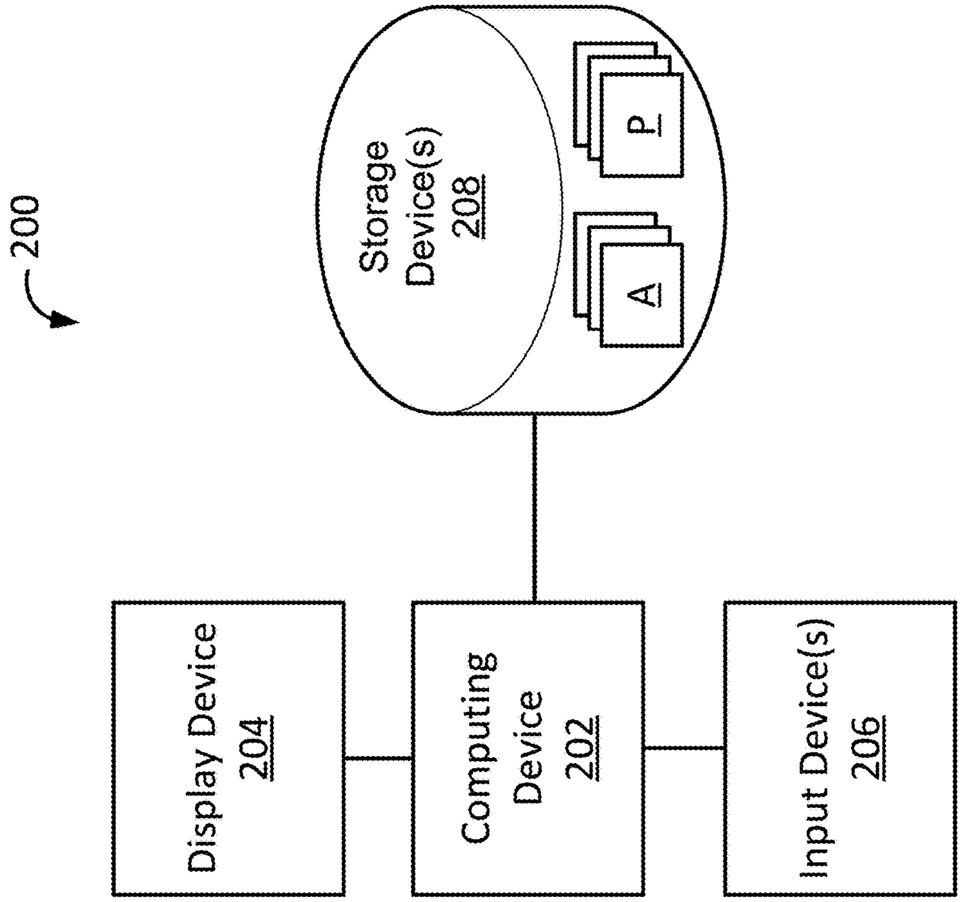
FIG. 3 is schematic diagram of an example system for associating two types of identification events with each other, in accordance with one or more embodiments.

With reference to FIG. 3, an example system 200 is illustrated. The system 200 may be used for associating at least one license plate number with at least one user. More specifically, the system 200 may be used to find one or more candidate users for a given license plate number and/or may be used to find one or more candidate license plate numbers for a given user. An operator of the computing device 202 may interact with the computing device 202 via a graphical user interface (GUI) displayed on a display device 204 using one or more input devices(s) 206. For example, the operator may interact with the computing device 202 using the input device(s) 206 to query the computing device 202 to determine at least one candidate user for a provided license plate number. By way of another example, the operator may interact with the computing device 202 using the input device(s) 206 to query the computing device 202 to determine at least one candidate license plate number for a provided user identifier (e.g., a name, an identification number, or the like). The computing device 202 may access one or more storage devices 208 comprising LPR data P and user access data A. The LPR data P and user access data A may be stored in separate storage devices. The storage device(s) 208 may comprise the storage device(s) 106 and/or 116 of FIG. 1. The computing device 208 may communicate with the server(s) 104 and/or 114 of FIG. 1 in order to access the LPR data P and/or the user access data A. Depending on the query, the computing device 202 may process the LPR data P and user access A data in order to determine one or more candidate users for a provided license place or one or more candidate license plate numbers for a provided user identifier. The computing device 202 may output an indication for the one or more candidate users or license plate numbers for presentation of the display device 204 via the GUI.

The computing device 202 may implement one or more software applications and/or algorithms to perform the functionality of the computing device 202 described herein. The computing device 202 may be any suitable computing device, such as a desktop computer, a laptop computer, a mainframe, a server, a distributed computing system, a portable computing device, a mobile phone, a tablet, or the like. The computing device 202 may access the server(s) 104 and/or 114 over one or more of networks, for example, such as the network(s) described elsewhere in this document. The display device 204 may be any suitable display device, for example, such as a cathode ray tube display screen, a light-emitting diode display screen, a liquid crystal display screen, a touch screen, or any other suitable display device. The input device(s) 206 may comprise a keyboard, a mouse, a touch pad, a joy stick, a light pen, a track ball, a touch screen, or any other suitable input device for interacting with the GUI. In embodiments where the display device 204 is a touch screen device, the input device(s) 206 comprise the display device 204. In some embodiments, the computing device 202 is a server or implements server-like functions, and another computing device associated with the at least one input device 206 and the display device 204 may communicate with the computing device 202 for requesting that the computing device 202 perform the functionality described herein.

Figure 4A:
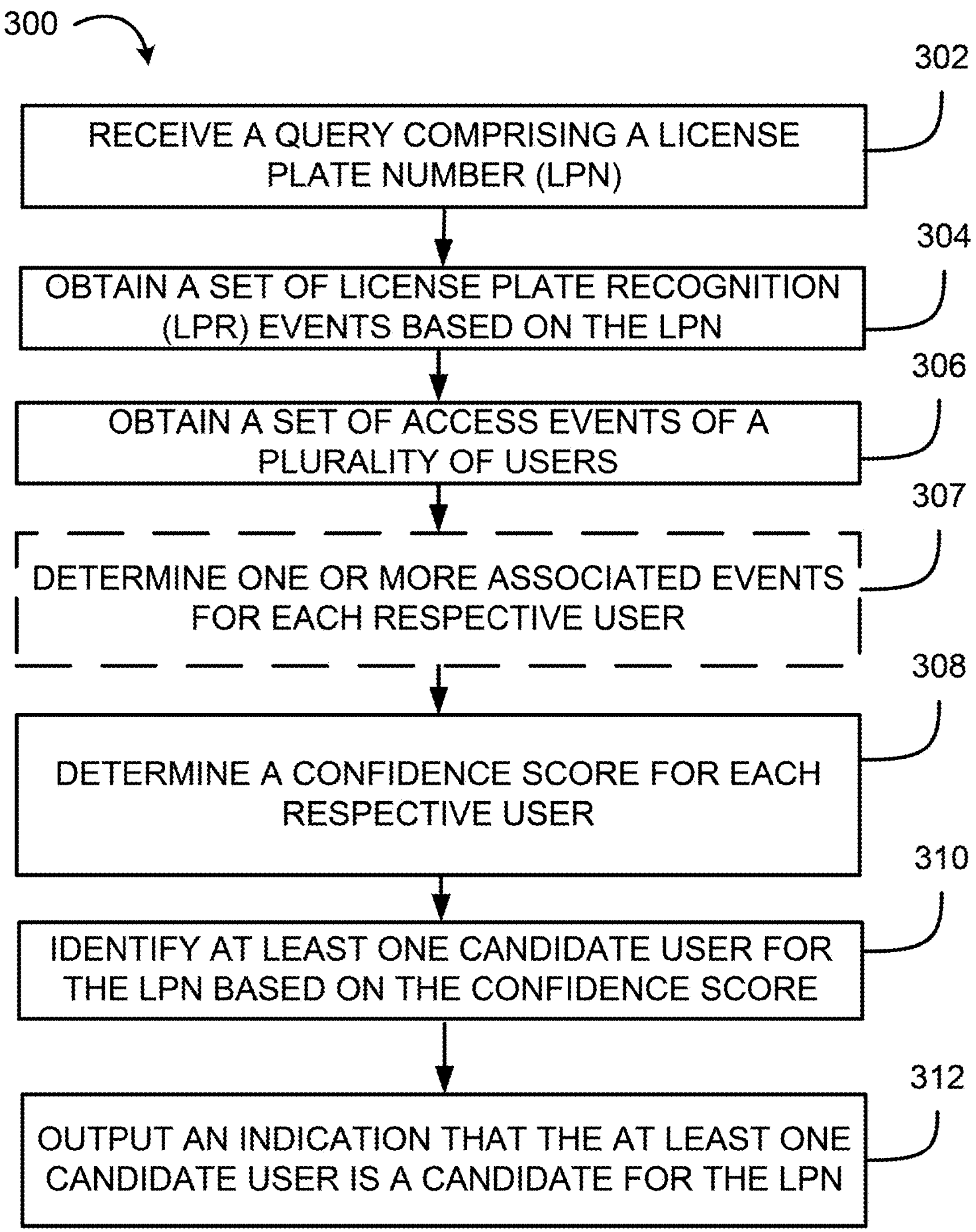
FIG. 4A is a flowchart illustrating an example method for determining at least one candidate user for a license plate number, in accordance with one or more embodiments.

With reference to FIG. 4A, there is shown a flowchart illustrating an example computer-implemented method 300. The method 300 is for determining at least one candidate user for a license plate number (LPN). The method 300 is performed at a computing device, such as computing device 202 of FIG. 3. At step 302, the method 300 comprises receiving a query comprising the LPN. The query may be received at the computing device 202 via the input device(s) 206. The query is for requesting that at least one candidate user for the LPN be determined. The query may comprise any other suitable parameter(s) for setting the criterion for identifying the candidate user(s). The parameter(s) provided by the query may be used to set one or more algorithms used for determining the candidate user(s). In some embodiments, one or more of parameters for setting the algorithm(s) may have been preprogrammed. The query may be automatically generated by the computing device 202, regularly or irregularly. Accordingly, in some embodiments, receiving the query at the computing device 202 comprises generating the query at the computing device 202. The query may be generated by the computing device 202 at regular time intervals (e.g., once a day, once a week, once a month, etc.). The query may be generated for each LPN in the LPR data P to determine candidate user(s) for each LPN. The query may be generated for each LPN in the LPR data P when the LPR data P is updated with new LPR events. For example, the computing device 202 may periodically or irregularly query the LPR data P to identify current LPNs and then perform the method 300 for each of the current LPNs. Accordingly, the method 300 may be performed to generate a self-updating or automatic-updating database of associations between LPNs and users.

At step 304, the method 300 comprises obtaining a set of LPR events $P_{LPN}$ that correspond to the LPN. The LPR data P stored on the storage device 208 may be accessed by the computing device 202 to obtain the set of LPR events $P_{LPN}$ using the LPN. Obtaining the set of LPR events $P_{LPN}$ may comprise identifying the LPR events in the LPR data P which correspond to the LPN. The LPR data P may be filtered with the LPN to obtain the set of LPR events $P_{LPN}$. For example, the LPR data P may be a relational database and the set of LPR events may be a table of LPR events that correspond to the LPN.

At step 306, the method 300 comprises obtaining a set of access events of a plurality of users. For example, a set of access events $A_{LPN}$ may be obtained based on the set of LPR events $P_{LPN}$. The set of access events $A_{LPN}$ may occur around the LPR events in the set of LPR events $P_{LPN}$. The user access data A stored on the storage device(s) 208 may be accessed by the computing device 202 to obtain the set of access events $A_{LPN}$ by identifying access events that occur in a time window surrounding any LPR event in the set of LPR events $P_{LPN}$. In other words, each access event in the set of access events $A_{LPN}$ may occur in a time window surrounding any LPR event in the set of LPR events $P_{LPN}$. Alternatively, the set of access events may correspond to the user access data A comprising a plurality of access events. While various embodiments and examples are described herein with reference to the set of access events $A_{LPN}$, it should be appreciated that the set of access events "$A_{LPN}$" may be interchanged with the set of access events "A" corresponding to the user access data A in some embodiments.

The time window may be implemented with both a minimum time separation δ between events and a maximum time separation Δ between events. The time window may be applied prior to and/or after a given LPR event. Accordingly, for a given LPR event at time $t_p$, access events around the time window $t_p-\Delta$ to $t_p-\delta$ and/or $t_p+\delta$ to $t_p+\Delta$ may be considered for the set of access events $A_{LPN}$. If the LPR data P does not indicate that the LPR events are entry or exit events, the time window may correspond to $t_p-\Delta$ to $t_p-\delta$ and $t_p+\delta$ to $t_p+\Delta$. In other words, in some embodiments, the user access data A and the LPR data P do not discriminate between entry and exit events. However, if the LPR data P does indicate that the LPR events are entry or exit events, the time window may correspond to $t_p-\Delta$ to $t_p-\delta$ for exit LPR events and $t_p+\delta$ to $t_p+\Delta$ for entrance LPR events. Furthermore, if the user access data A also contains the type of access events (i.e., entrance events and exit events), then only exit user access events may be used for the time window around the exit LPR events and only entrance user access events may be used for the time window around the entrance LPR events. The maximum time separation Δ is set to limit the events to reasonably connected events. Also, as a license plate for a given user would not be read at the same time that the same given user accesses a building, it may be appropriate to consider events at least δ apart. By way of specific and non-limiting example, maximum time separation Δ may be 10 minutes and minimum time separation δ may be 20 seconds. The values for Δ, δ may vary depending on practical implementation and may be set according to the environment from which the data originates. In some embodiments, the minimum time separation δ may be omitted from the time window or may be set to zero (0).

Each LPR event in the set $P_{LPN}$ has a timestamp indicating that the LPR event occurs at a given time $t_p$. The time window $t_p-\Delta$ to $t_p-\delta$ and/or $t_p+\delta$ to $t_p+\Delta$ may be determined for each LPR event in the set of LPR events $P_{LPN}$. Each access event in the set of access events $A_{LPN}$ has a timestamp $t_a$. Accordingly, obtaining the set of access events $A_{LPN}$ may comprise identifying the access events in the user access data A that have timestamps $t_a$ that occur in the time window $t_p-\Delta$ to $t_p-\delta$ and/or $t_p+\delta$ to $t_p+\Delta$ for each LPR event in the set of LPR events $P_{LPN}$. For example, the user access data A may be a relational database, and for a given row that has an access event in the time window $t_p-\Delta$ to $t_p-\delta$ and/or $t_p+\delta$ to $t_p+\Delta$, a first field (not illustrated in FIG. 2) may be set (e.g., set to 1). A second field (not illustrated in FIG. 2) may be flagged (e.g., incremented by 1) for the rows containing a first occurrence of the user amongst all those flagged in the first field for this LPR event. The second field may be incremented by 1, rather than set to 1, in order to count each LPR event exactly once for each respective user. For example, the user access data A may be a relational database and the set of user events $A_{LPN}$ may be a table of access events that occur in the time window of any LPR event in the table $P_{LPN}$. The table $A_{LPN}$ may be calculated as all rows of the user access data A for which the first field is set.

In some embodiments, a list of users $L_{users}$ appearing in the set of access events $A_{LPN}$ is obtained. The list of user $L_{users}$ may be obtained at step 306 or at any other suitable time during the performance of the method 300. The set of access events $A_{LPN}$ may be traversed to the obtained the list of user $L_{users}$ by identifying all users that uniquely appear in the set of access events $A_{LPN}$. The list of users $L_{user}$ may be determined by taking all rows of A for which the second field is strictly positive, and grouping the entries by the user identifier, and then generating the list $L_{user}$ therefrom.

At step 307, in some embodiments, the method 300 comprises determining one or more associated events for each respective user from at least a subset of the plurality of users identifiable in the set of access events. The associated event(s) may be determined for each user identifiable in the set of access events A or for a subset of users from the set A (e.g., for each user having one or more access events occurring in the time window surrounding any LPR event in the set of set of LPR events $P_{LPN}$). The associated event(s) may be determined for each user identifiable in the set of access events $A_{LPN}$ or for a subset of users from the set $A_{LPN}$. The list of user $L_{users}$ may be processed to determine the one or more associated events for each respective user in the list $L_{users}$. The one or more associated events for each respective user may be determined based on one or more access events in the set of access events $A_{LPN}$ for the respective user that occur around the set of LPR events $P_{LPN}$. For example, for a respective user, each of the one or more associated events may correspond to a given LPR event in the set of LPR events $P_{LPN}$ that has a corresponding access event in the set of access events $A_{LPN}$ for the respective user that occurs in the time window $t_p-\Delta$ to $t_p-\delta$ and/or $t_p+\delta$ to $t_p+\Delta$ of the given license plate recognition event occurring at $t_p$. In other words, the one or more associated events for a respective user may correspond to the LPR events in the set of LPR events $P_{LPN}$ that have at least one corresponding access event in the set of access events $A_{LPN}$ for the respective user that occurs in the time window. Determining the one or more associated events may comprise identifying the one or more associated events for each respective user. Identifying the one or more associated events for each respective user may occur as part of step 306, as the user access data A may be processed at step 306 to identify access events that occur in the time window surrounding any LPR event in the set of LPR events $P_{LPN}$. Determining the one or more associated events may comprise determining an amount of the one or more associated events for each respective user. In other words, the number of the one or more associated events for each respective user may be determined.

At step 308, the method 300 comprises determining a confidence score for each respective user from at least a subset of the plurality of users identifiable in the set of access events. The confidence score may be determined for each user identifiable in the set of access events A or for a subset of users from the set A (e.g., for each user having one or more access events occurring in the time window surrounding any LPR event in the set of set of LPR events $P_{LPN}$). The confidence score may be determined for each user identifiable in the set of access events $A_{LPN}$ or for a subset of users from the set $A_{LPN}$. The list of user $L_{users}$ may be processed to calculate the confidence score for each respective user in the list $L_{users}$. The confidence score for each respective user may be determined based on an association between access events for the respective user in the set of access events $A_{LPN}$ and at least some LPR events in the set of LPR events $P_{LPN}$. The association for the respective user may be a statistical correlation or may be one or more associated events for the respective user. The confidence score for each respective user may be determined based on a statistical correlation between access events for the respective user in the set of access events $A_{LPN}$ and at least some LPR events in the set of LPR events $P_{LPN}$. The confidence score for each respective user may be determined based on the one or more associated events for the respective user. In some embodiments, step 307 may occur as part of step 308. That is, the one or more associated events for the respective user may be determined as part of determining the confidence score for the respective user. The confidence score for each respective user may be determined based on an amount of the one or more associated events for the respective user. In other words, the confidence score may be determined based on the number of LPR events in the set of LPR events $P_{LPN}$ that have a corresponding access event of the set of access events $A_{LPN}$ for the respective user that occur in the time window. The confidence score may be determined for each respective user based on one or more time differences between the one or more associated events for the respective user. In other words, the confidence score may be determined based on one or more time differences between events in the set of LPR events $P_{LPN}$ and the set of access events $A_{LPN}$. The confidence score may be determined based on the amount of the one or more associated events and the time differences between the one or more associated events.

At step 310, the method 300 comprises identifying at least one candidate user for the LPN based at least in part on the confidence score for the at least one candidate user. The confidence scores of the users may be filtered and/or sorted. For example, one or more users in the list of users $L_{users}$ may be removed as candidates. This is because, a certain number of observances may be necessary to give an accurate prediction. Accordingly, if the number of associated events for a respective user is below a threshold minfreq, that user and corresponding confidence score may be disregarded. The confidence scores may be sorted from highest to lowest score. In some embodiments, the candidate user identified at step 310 is the user having the highest confidence score. In some embodiments, the candidate users identified at step 310 are a defined number of users having the highest N number of confidence scores (i.e., the N number of best candidates). In some embodiments, the candidate users identified at step 306 are the users having a confidence score above a threshold T. In some embodiments, more than one user may be associated with a vehicle associated with the LPN (e.g., if two or more users carpool) and identifying the candidate users may comprise identifying that the LPN may be associated with more than one user and providing multiple candidate users for the LPN.

At step 312, the method 300 comprises outputting an indication that the at least one candidate user is a candidate for the LPN. The computing device 202 may output the indication for presentation on the display device 204. The indication may be a result listing. The result listing may comprise the candidate user(s) and the corresponding confidence score(s). The result listing may comprise a best candidate user of the plurality of users, which may be the candidate user with the highest confidence score. The result listing may comprise best candidate users which may be the top candidates users with the highest confidence scores. The indication may be one or more plots and/or graphs. The indication may comprise any suitable information pertaining to the candidate user, for example, such as any of a name, identification number, office number, telephone number, etc.

Figure 4B:
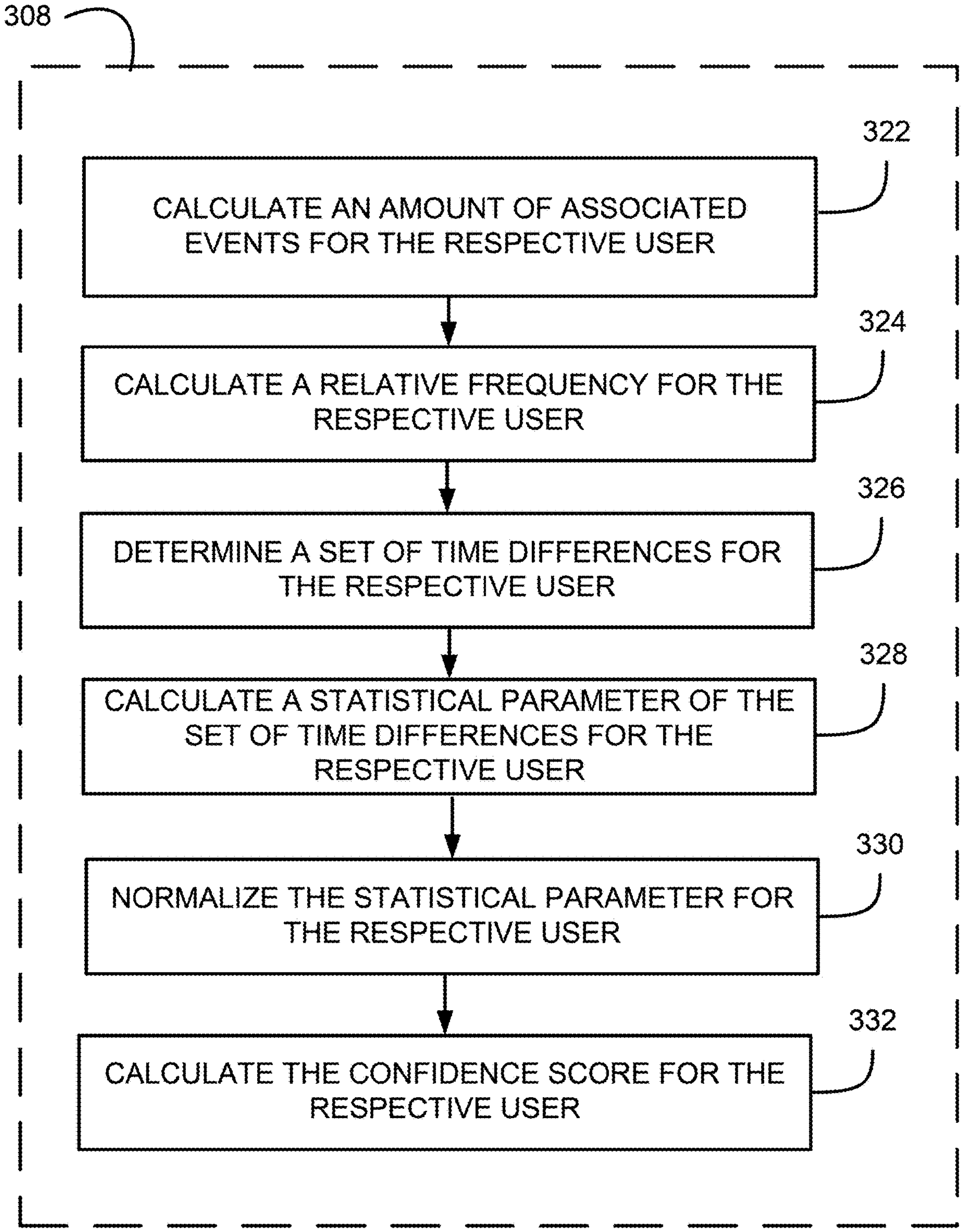
FIG. 4B is flowchart illustrating an example embodiment for calculating a confidence score for a at least one candidate user, in accordance with one or more embodiments.

With additional reference to FIG. 4B, an example embodiment of step 308 of FIG. 4A is illustrated. Step 308 illustrated in FIG. 4B may be repeated for each respective user of the plurality of users and is described with reference to a given respective user of the plurality of users. At step 322, in some embodiments, the amount of associated events for the respective user is calculated. In other words, the number of LPR events in the set of LPR events $P_{LPN}$ that have a corresponding access event of the respective user in the set of access events $A_{LPN}$ that occurs in the time window is determined. Continuing with the example discussed above at step 306, the amount of associated events may be determined as a sum of the second field of the user access data A. In some embodiments, the amount of the associated events may be determined elsewhere in the method 300.

At step 324, in some embodiments, a relative frequency for the respective user is calculated. The relative frequency may be calculated by dividing the amount of associated events (e.g., as determined at step 322) for the respective user by the total number of LPN events in the set of LPR events $P_{LPN}$. The total number of LPN events in the set of LPR events $P_{LPN}$ corresponds to the total number of LPR events for the LPN. The relative frequency is indicative of a percentage of LPR events for the LPN that have a corresponding access event of the respective user that occurs in the time window of any LPR event for the LPN. The relative frequency may be multiplied by one hundred (100) to represent the value as a percentage.

At step 326, in some embodiments, a set of time differences G for the respective user is determined. The set of time differences G corresponds to one or more time differences between the one or more associated events for the respective user. In other words, the set of time differences G corresponds to one or more time differences between each LPR event in the set of LPR events $P_{LPN}$ having at least one corresponding access event for the respective user and the at least one corresponding access event for the respective user. More specifically, each time difference in the set of time differences G is a difference in time between a given LPR event in the set of LPR events $P_{LPN}$ that occurs at time $t_p$ and a given access event in the set of access events $A_{LPN}$ for the respective user that occurs at time $t_a$, where the time $t_a$ that the given access events occurs is within the time window $t_p-\Delta$ to $t_p-\delta$ and/or $t_p+\delta$ to $t_p+\Delta$.

By way of an example, the set of time differences G for the respective user may be determined by first initiating an empty list G. Then, a first loop may be performed for each LPR event in the set of LPR events $P_{LPN}$. In the first loop, a LPR event timestamp $t_p$ is obtained for a given LPR event and a second loop is performed for the given LPR event. The second loop is performed for each access event in the set of access events $A_{LPN}$ corresponding to the respective user that occurs in the time window $t_p-\Delta$ to $t_p-\delta$ and/or $t_p+\delta$ to $t_p+\Delta$ of the timestamp $t_p$. In the second loop, an access event timestamp $t_a$ is obtained for a given access event and a time difference $t_p-t_a$ between the LPR event timestamp $t_p$ and the access event timestamp $t_a$ is determined. In the second loop, the time difference $t_p-t_a$ is added to the set of time differences G. The access event timestamp $t_a$ may also be added to the set of time differences G to indicate the time at which the time difference $t_p-t_a$ occurred. Accordingly, the set of time differences G for the respective user may comprise a plurality of records $\{t_p-t_a, t_a\}$.

By way of another example, step 326 may comprise obtaining a subset of access events of the set of access events $A_{LPN}$, where the subset of access events corresponds to the access events for the respective user. Then, each of the LPR events in set of LPR events $P_{LPN}$ is looped through and for each LPR event the subset of access events is filtered by selecting the access events with timestamps $t_a$ in the time window $t_p-\Delta$ to $t_p-\delta$ and/or $t_p+\delta$ to $t_p+\Delta$, thereby generating a filtered subset of access events. A first list may then be created out of the timestamps $t_a$ of the filtered subset of access events and a second list may be created out of the time differences between the timestamps $t_a$ of the filtered subset of access events and the timestamps $t_p$ of the of set of LPR events $P_{LPN}$. The first and second lists may be combined to generate the set of time differences G for the respective user comprising a plurality of paired records $\{t_p-t_a, t_a\}$ of the time differences and the corresponding times for the time differences.

At step 328, in some embodiments, a statistical parameter of the set of time differences G for the respective user is calculated. The statistical parameter may be a variance, a standard deviation, a measure of variability, or any other suitable statistical parameter indicative of goodness of fit. In some embodiments, the variance of the time differences may be a weighted average of the time differences over a plurality of periods of time of a day. The periods of time for determining the weighted average variance may be uniform or non-uniform periods of time. For example, the variance may be a weighted average over each hour throughout the day. Accordingly, the weighted average variance may be calculated as:

$$\text{Weighed Average Variance} = \frac{1}{\# G}\sum_{i=0}^{23} \# G_i \cdot \text{Var}(G_i)$$

where #G corresponds to the total number of time differences in the set of time differences G, where $\#G_i$ corresponds to the number of time differences in the in the i-th hour of the day per a twenty-four (24) hour clock and Var $(G_i)$ corresponds to the variance of the time differences in the i-th hour of the day per a twenty-four (24) hour clock. The periods of time for determining the weighted average may vary depending on practical implementations. For example, the period of time may be 20 minutes, 30 minutes, 2 hours or any other suitable value. It may be suitable to determine the weighted average of the variance because of factors such as time of arrival. For example, the parking lot may fill up as the day progresses and the users may have to park further away from the access point, which results in the users having to walk further from their vehicles to the access point. A weighted average of any other suitable statistical parameter may be determined in a similar manner.

At step 330, in some embodiments, the statistical parameter of step 328 may be normalized. The statistical parameter is normalized to obtain a value between zero (0) and one (1). The normalization of the variance may be calculated as:

$$\text{Normalize Variance} = \frac{\alpha}{\text{var} + \alpha} = \frac{1}{(\text{var}/\alpha) + 1}$$

where α is a parameter that controls the tolerance of the variance and var is the variance as determined at step 328. The value for the parameter a may be determined based on the dataset by observing the variances of known matches. In some embodiments, candidates having a variance above a variance threshold (e.g., 3α) may be disregarded. Disregarding candidates having a variance above the variance threshold may be performed as part of the filtering aspect discussed at step 310. Any other suitable statistical parameter may be normalized in a similar manner.

At step 332, in some embodiments, the confidence score for the respective user is calculated. The confidence score may be calculated in various manners depending on practical applications. In some embodiments, the confidence score for the respective user is calculated based on the amount of associated events for the respective user. For example, the confidence score for the respective user may be the amount of associated events for the respective user. In some embodiments, the confidence score for the respective user is calculated based on the relative frequency for the respective user determined at step 324. For example, confidence score for the respective user may be the relative frequency for the respective user. In some embodiments, the confidence score for the respective user is calculated based on the set of time differences for the respective user determine at step 326. In some embodiments, the confidence score for the respective user is calculated based on the statistical parameter (e.g., variance) for the respective user determined at step 328. The statistical parameter for the respective user used to determine the confidence score may be a weighted average as noted in step 328 and/or may be normalized as per step 330. For example, the confidence score for the respective user may be the statistical parameter (e.g., variance) for the respective user (e.g., the normalized weighted average of the variance). In some embodiments, the confidence score for the respective user is determined as the product of the relative frequency for the respective user and the statistical parameter (e.g., variance) for the respective user. The confidence score for the respective user may be calculated as:

$$\text{confidence score} = \frac{\alpha \cdot freq}{(\text{var} + \alpha)}$$

where freq is the relative frequency for the respective user and var is the variance for the respective user. The confidence score may be calculated in a similar manner using any other suitable statistical parameter.

The confidence score for each respective user may be determined in any other suitable manner and FIG. 4B is only one example illustrating various embodiments that may be used to determine the confidence score. The confidence score for the respective user may be determined based on a statistical correlation between access events for the respective user in the set of access events $A_{LPN}$ (or A) and at least some LPR events in the set of LPR events $P_{LPN}$. The statistical correlation may correspond to the statistical parameter noted elsewhere in this documents. Any suitable statistical parameter may be determined in order to determine the confidence score. The statistical correlation may be determined as per one or more of the embodiments of FIG. 4B. The confidence score for the respective user may be determined based on a statistical correlation between the associated events for the respective user. The confidence score for the respective user may be determined by calculating the confidence score based on proximity in time between the access events for the respective user in the set of access events $A_{LPN}$ (or A) and at least some LPR events in the set of LPR events $P_{LPN}$. The proximity in time between events may correspond to the time differences between associated events. Accordingly, the confidence score may be determined based on the time differences between associated events for the respective user. The confidence score for the respective user may be determined by calculating the confidence score based on a measure of variability between the access events for the respective user in the set of access events $A_{LPN}$ (or A) and the LPR events in the set of LPR events $P_{LPN}$. The measure of variability may be any suitable statistical parameter indicative of variability of the time differences between associated events for the respective user. The measure of variability may be variance, standard deviation, or any other suitable statistical parameter. Accordingly, the confidence score may be determined based on the variance (or the standard deviation) between access events for the respective user in the set of access events $A_{LPN}$ (or A) and at least some LPR events in the set of LPR events $P_{LPN}$. The set of LPR events $P_{LPN}$ and the set of access events $A_{LPN}$ (or A) may be applied to any suitable predetermined function and each of the respective users may be scored based on how well they fit the function. For example, the time differences may be assumed to follow a delta function and the goodness of fit may be estimated from the variance. By way of another example, the randomness of the events may be accounted for by assuming the time differences to follow a Gaussian distribution, and goodness of fit may be estimated from any kind of normality test.

Referring back to FIG. 4A, in some embodiments, one or more scatter plots may be generated and outputted at step 312. A scatter plot for each time difference between associated events as a function of time of day may be generated for a respective user. A scatter plot of the number of associated events and the variance for a respective user may be generated. By way of another example, one or more graphs (e.g., bar graphs) may be generated and outputted at step 312, where the graph(s) visually presents any of the variance, the number of associated events, the relative frequency, and/or the confidence score. By way of yet another example, one or more connectivity graphs may be generated and outputted at step 312. Furthermore, the candidate user(s) for the result listing that may be sorted and ordered in any suitable manner. For example, the candidate user(s) may be sorted by any of the relative frequency of the users, the variance of the users, the weighted average variance of the users, the normalized variance of the users, the amount of associated events of the users, the confidence score of the users.

Figure 5A:
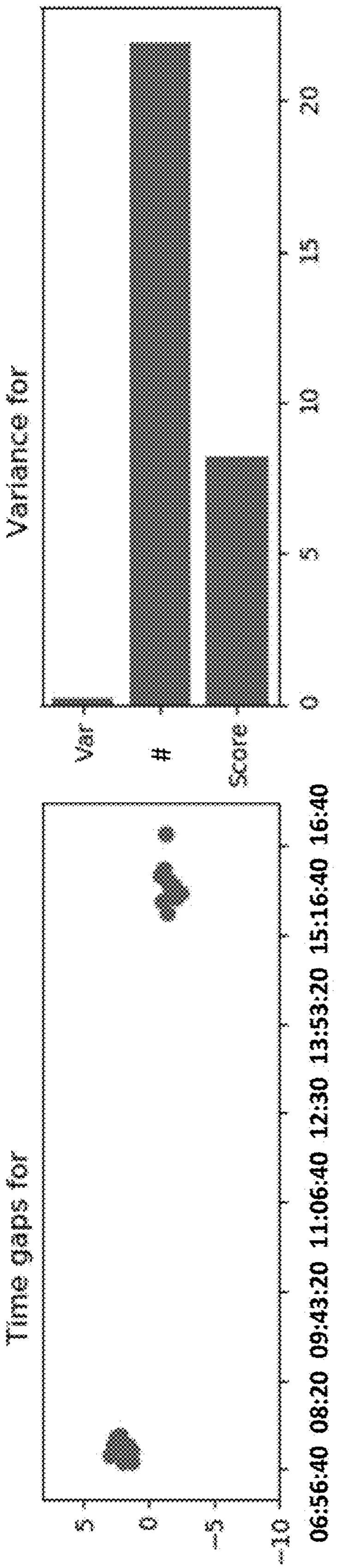
FIGS. 5A and 5B illustrate scatter plots and bar graphs for two different candidate users, which are each indicative of a good match between a given license plate number and a given candidate user, in accordance with one or more embodiments.
Figure 5B:
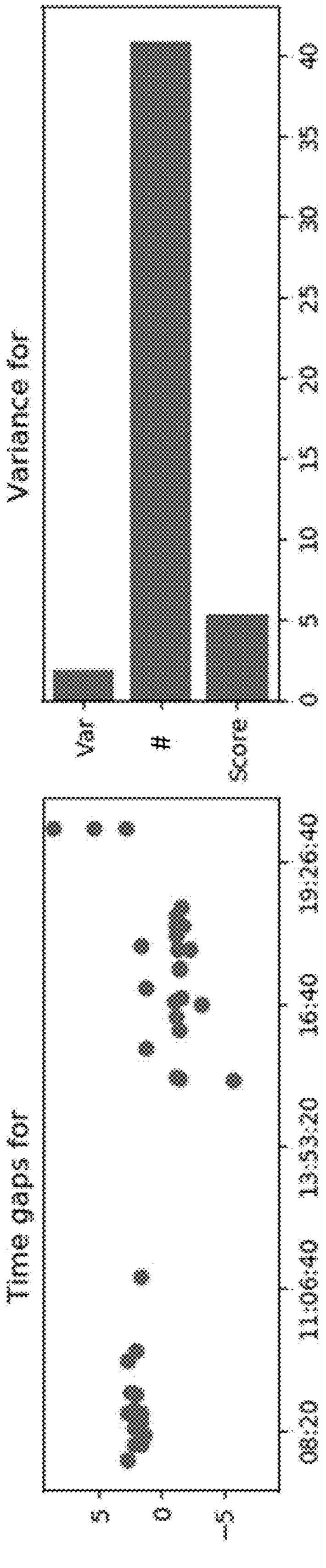
Figure 6A:
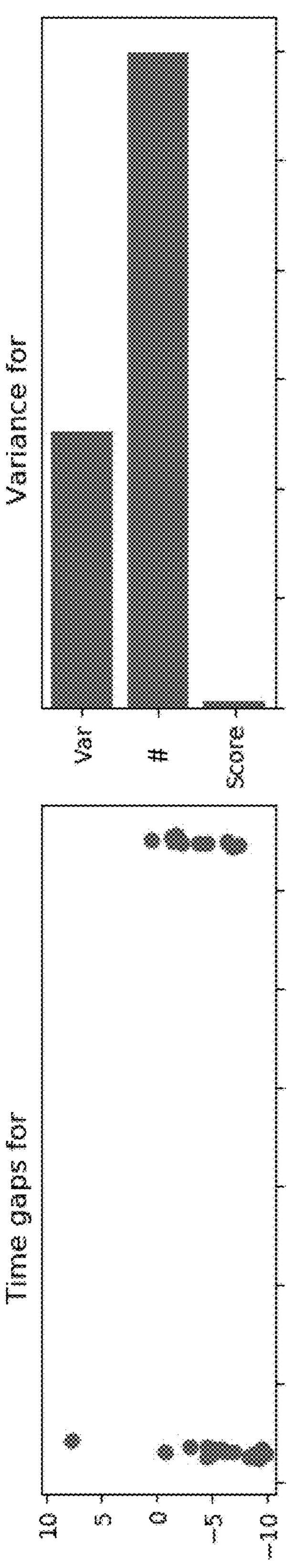
FIGS. 6A and 6B illustrate scatter plots and bar graphs for two different candidate users, which are each indicative of a poor match between a given license plate number and a given candidate user, in accordance with one or more embodiments.
Figure 6B:
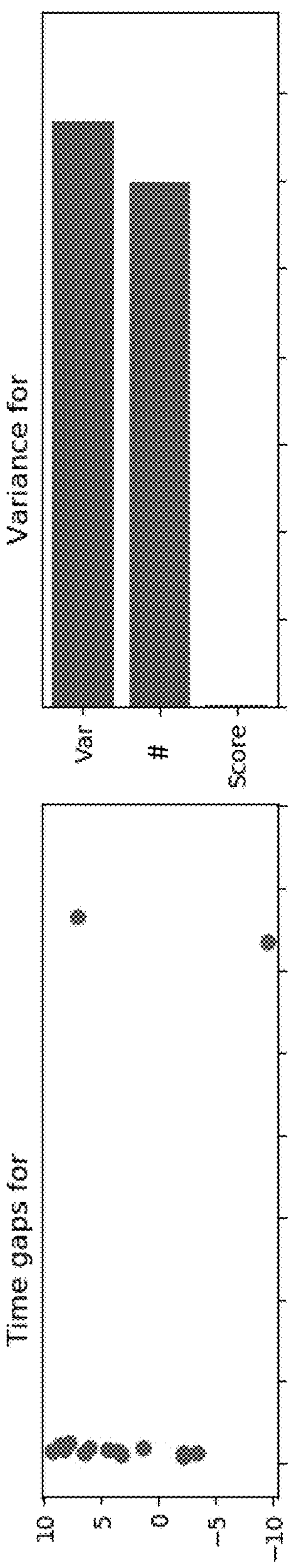

With reference to FIGS. 5A and 5B, scatter plots of the time difference for two different candidate users as a function of time of day are illustrated, which show good matches of the candidate users to the LPN. More specifically, in FIGS. 5A and 5B, the left subplots illustrate the time differences in the set of time differences, with time window on the y-axis and time of day on the x-axis. A match may be considered good when the data points have a small variability in the y-direction for a specific time of day—this means the time it takes the user to walk from the vehicle to the building with the access control point is consistent from day to day. Spread in the x-direction simply means that the matches happen at different times of day. The time differences are signed in these examples. That is, if positive, the LPR event occurs first and if negative, the access event occurs first. As such, one attribute looking for in a good match is if given a time of day the cluster of points is contained entirely either above or below the y=0 line. In FIGS. 5A and 5B, the right subplots illustrate bar graphs of the weighted average of the variance in the y-direction, the number of associated events, and the confidence score for the candidate user. A low variance typically indicates a better match and a low number for the number of associated events may indicate a false positive.

In contrast to the examples of FIGS. 5A and 5B, FIGS. 6A and 6B illustrate scatter plots and bar graphs with bad matches of candidate users to the LPN.

Figure 7A:
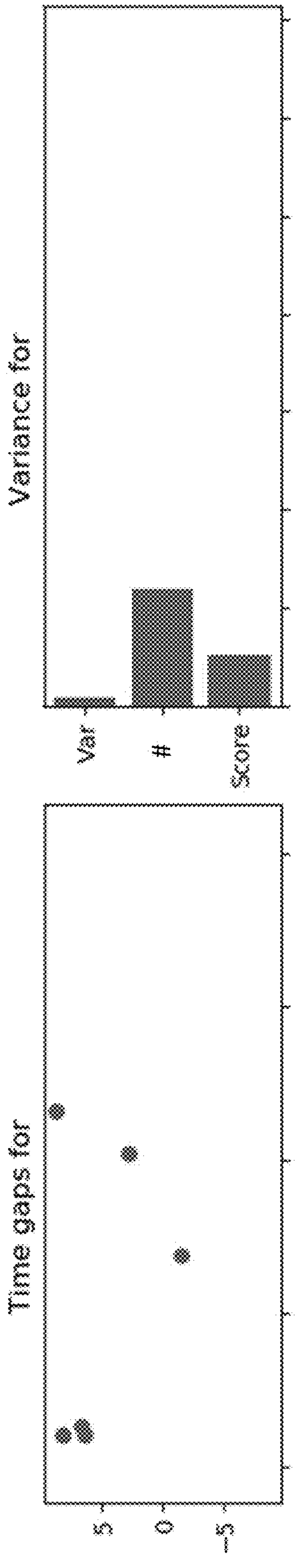
FIGS. 7A and 7B illustrate scatter plots and bar graphs for two different candidate user, where the second highest confidence score is the better match, in accordance with one or more embodiments.
Figure 7B:
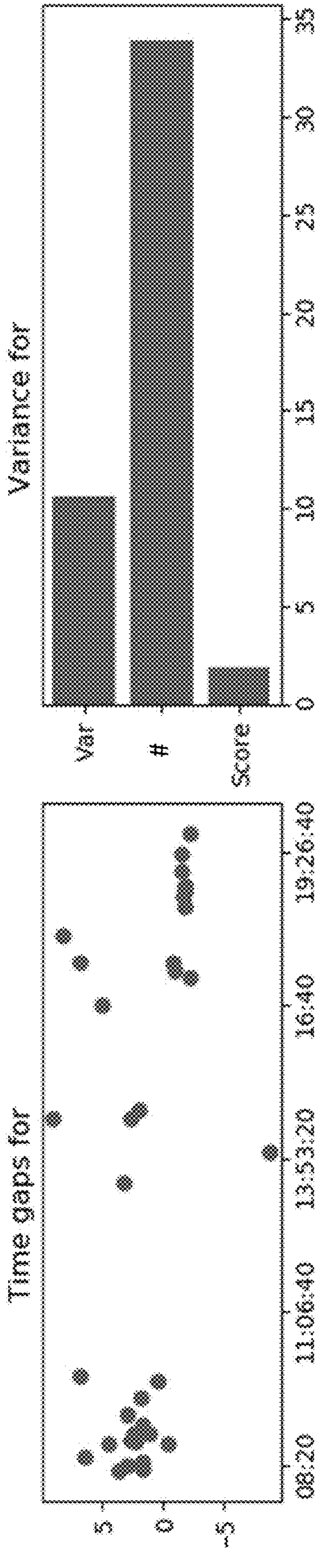

It should be appreciated that matches with the highest confidence score are not always the best match. Matches with very few gaps spread across a long period may produce false positives. With reference to FIGS. 7A and 7B, scatter plots and bar graphs illustrate that the second highest confidence score is actually the better match.

Figure 8:
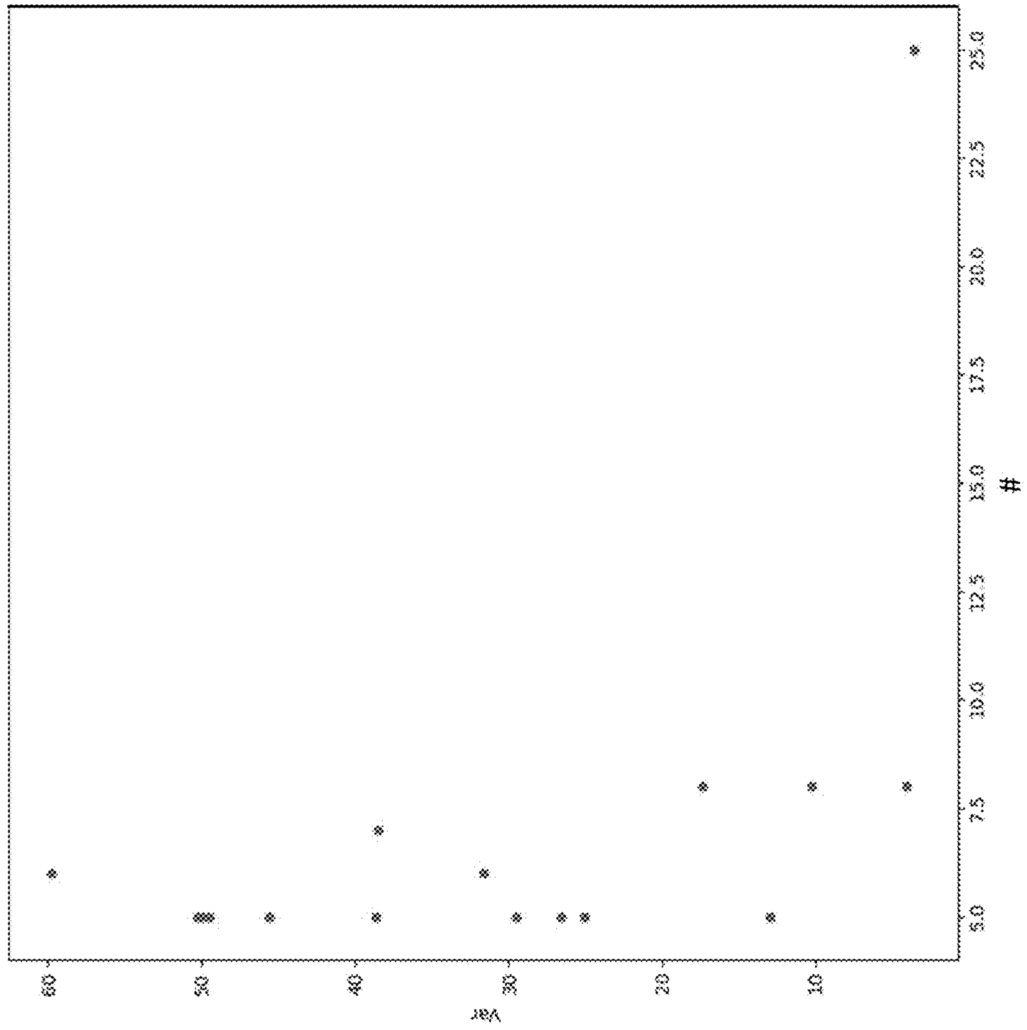
FIG. 8 is a scatter plot of a number of associated events versus variance for a plurality of candidate users, in accordance with one or more embodiments.

With reference to FIG. 8, a scatter plot illustrates the number of associated events on the x-axis and the variance on the y-axis, where each data point corresponds to a candidate user. As shown, the outlier point in the lower right corner of the graph has a high number of associated events and a low variance, which indicates that this candidate user is the best match to the LPN.

Figure 9A:
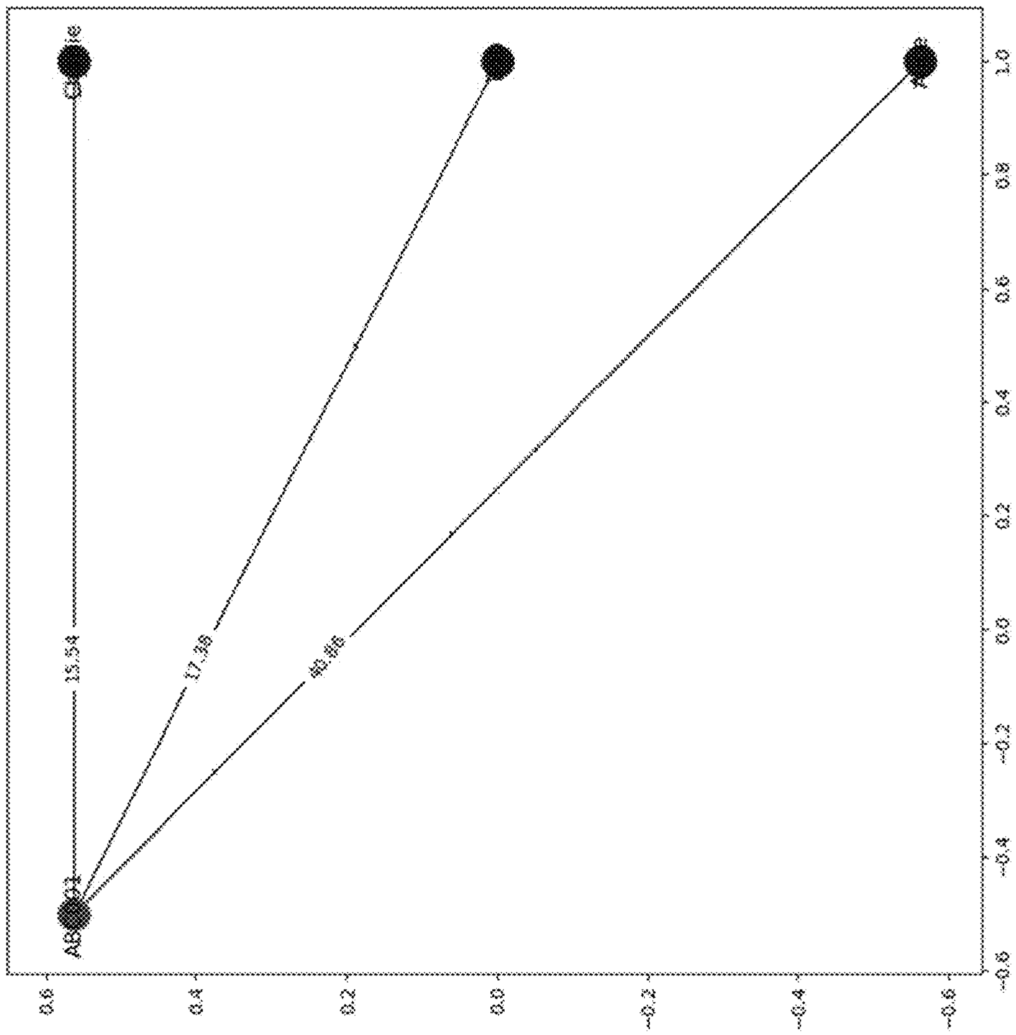
FIGS. 9A and 9B are connectivity graphs, in accordance with one or more embodiments.
Figure 9B:
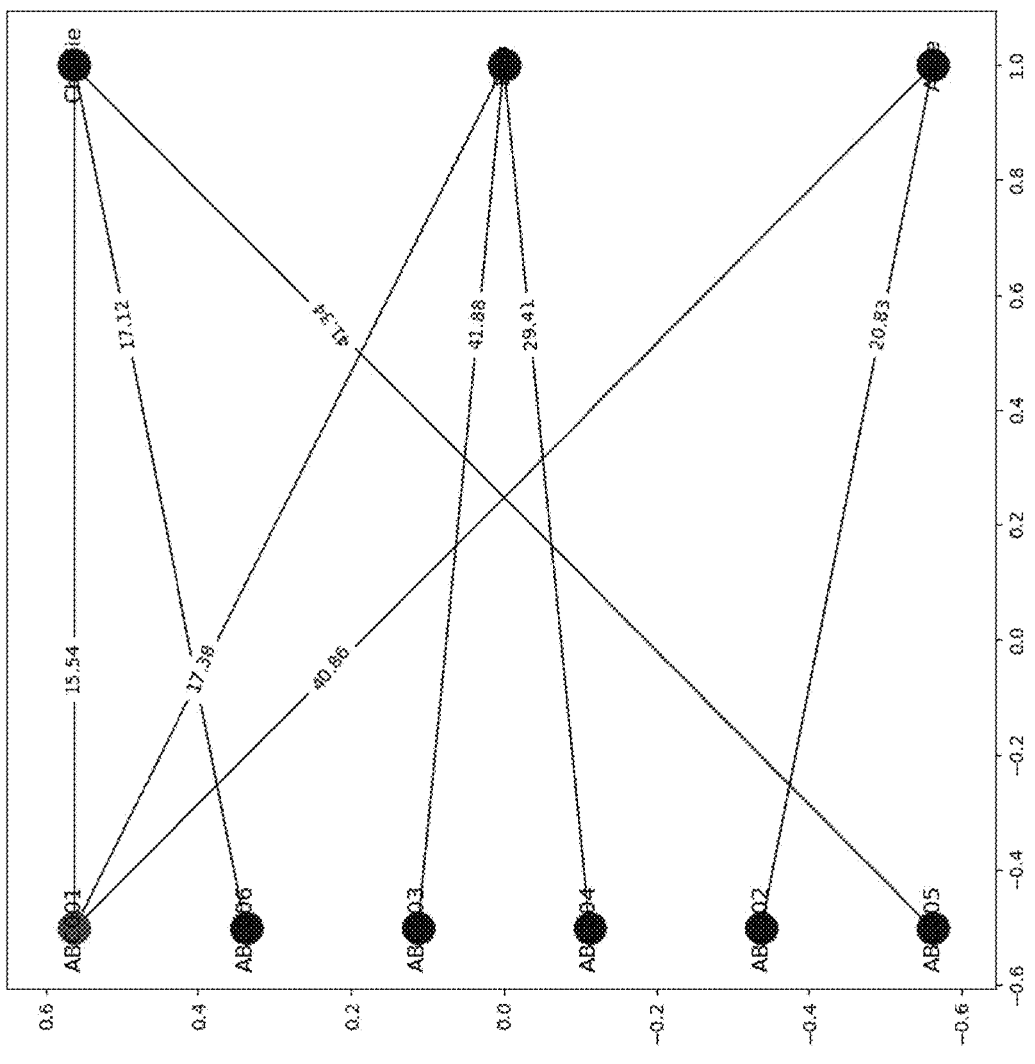

With reference to FIGS. 9A and 9B, connectivity graphs are illustrated. More specifically, FIG. 9A illustrates a bipartite graph where suitable candidate users are matched to a given license plate number. The node on left side of the graph of FIG. 9A illustrates a node for the license plate number ABC001, where the license plate number ABC001 was provided as part of the query for determining one or more candidate users for the license number ABC001. The three nodes on the right side of the graph of FIG. 9A illustrate three (3) candidate users Charlie, Bob, Alice for the license plate number ABC001. The edges between the nodes have a weight which corresponds to the confidence score for each of the users to the license plate number ABC001. In some embodiments, the connectivity graph is interactive for requesting additional candidates associated with a given node. For example, the operator of the computing device 202 of FIG. 3 may select via the input device 206 any one of the nodes to add all suitable candidate for the selected node. For instance, the operator may select each of Charlie, Bob and Alice to request candidate license plate numbers for each of these candidate users. Alternatively, in some embodiments, for each of the candidate users the corresponding candidate license plate numbers and confidence scores may be determined and plotted without selection by the operator. FIG. 9B illustrates the bipartite graph of FIG. 9B, where additional candidate license plate numbers ABC002, ABC003, ABC004, ABC005 and ABC006 for the candidate users Charlie, Bob, and Alice are shown. A given edge between a given license plate number node and a given user node has a weight which corresponds to the confidence score for that given user to that given license plate number. As can be seen from FIG. 9B, the best matches are Alice with ABC001, Bob with ABC003, and Charlie with ABC005. Other plots and/or graphs may be looked at to confirm the attribution indicated by FIG. 9B. In the example shown in FIG. 9A, the radius of the connectivity graph is one (1) and in the example shown in FIG. 9B, the radius of the connectivity graph is two (2); however, a maximal value for the radius of the connectivity graph may be set at any suitable value. As used herein, the term "radius" in relation to the connectivity graph refers to the eccentricity of the initial node (i.e., the largest distance to any other node).

Referring back to FIG. 4A, in some embodiments, at step 302, the query may comprise any one or more of the following parameters: the LPN, the confidence score threshold T that a given confidence score is to exceed in order for the corresponding user to be considered a candidate, the threshold minfreq for the minimum number of associated events for a respective user in order for the respective user to be considered a candidate, the N number of highest confidence scores and corresponding candidate users to consider, the minimum time separation δ, the maximum time separation Δ, the tolerance parameter a of the variance, the user access data A, the LPR data P, the radius of the connectivity graph and/or any other suitable information. The radius corresponds to a number of back and forth between analysis by license plate number and by user. Any of the aforementioned parameters may be preprogrammed and accordingly may be omitted from the query.

Figure 10A:
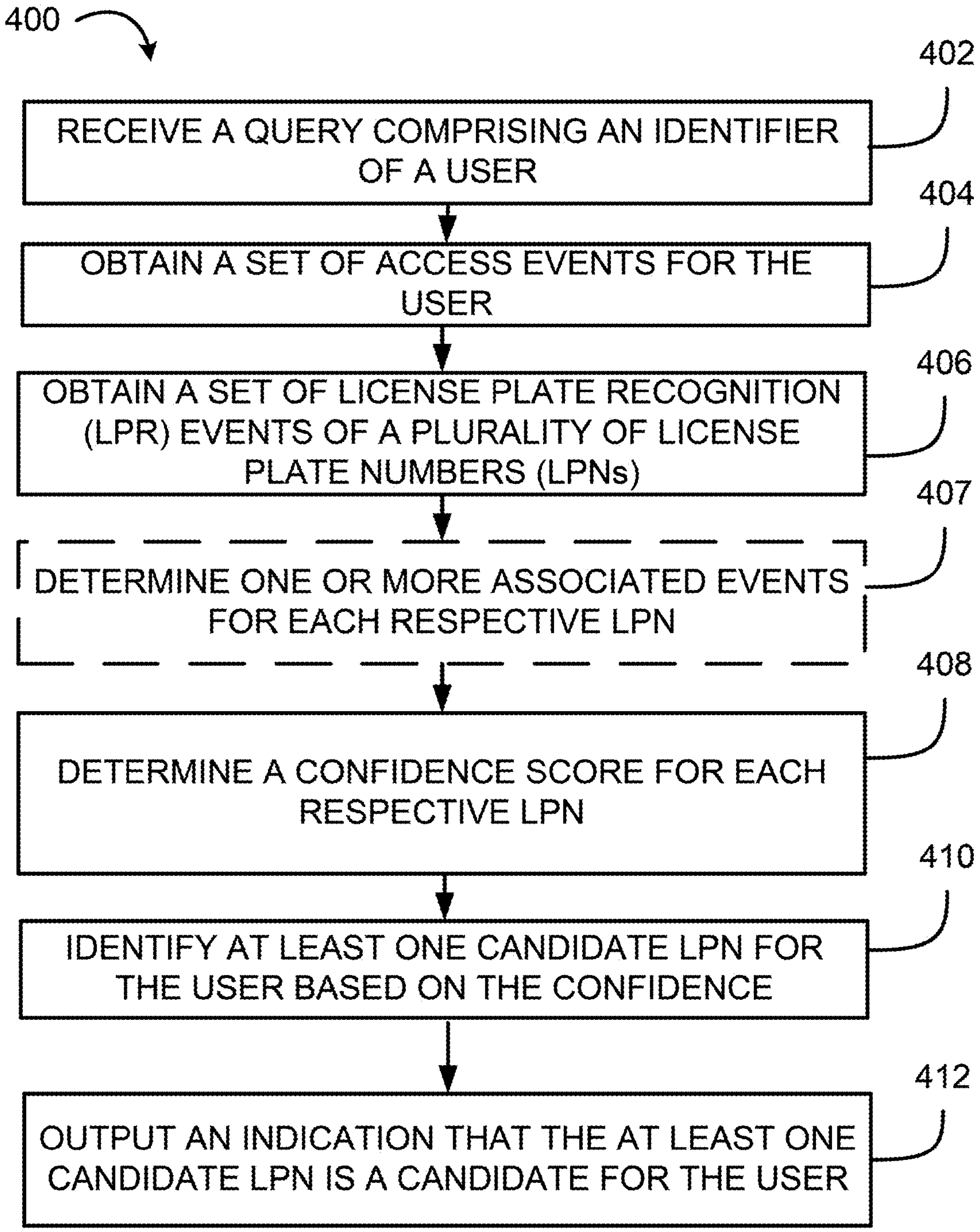
FIG. 10A is a flowchart illustrating an example method for determining at least one candidate license plate number for a user, in accordance with one or more embodiments.

With reference to FIG. 10A, there is shown a flowchart illustrating an example computer-implemented method 400. The method 400 is for determining at least one candidate LPN for a user. The method 400 is similar to the method 300 of FIG. 4A, as the method 400 is for determining at least one candidate LPN for a user and the method 300 is for determining at least one candidate user for a LPN. Accordingly, one or more aspects of the method 300 may be used to implement the method 400. The method 400 is performed at a computing device, such as computing device 202 of FIG. 3. At step 402, the method 400 comprises receiving a query comprising an identifier of a user. The identifier may be an identification number associated with the user (e.g., an employee identification number, an access device number, etc.), a name (e.g., first and/or last name) of the user, or any other suitable identifier. The query is for requesting that at least one candidate LPN for the user be determined. The query may comprise any other suitable parameter(s) for setting the criterion for identifying the candidate LPN(s). The parameter(s) provided by the query may be used to set one or more algorithms used for determining the candidate LPN(s). In some embodiments, one or more of parameters for setting the algorithm(s) may have been preprogrammed. The query may be automatically generated by the computing device 202, as described elsewhere in this document. The query may be generated for each user in the user access data A to determine candidate LPN(s) for each user. The query may be generated for each user in the user access data A when the user access data A is updated with new user access events. For example, the computing device 202 may periodically or irregularly query the user access data A to identify current users and then perform the method 400 for each of the current users. Accordingly, the method 400 may be performed to generate a self-updating or automatic-updating database of associations between users and LPNs.

At step 404, the method 400 comprises obtaining a set of access events $A_{user}$ that correspond to the user based on the identifier. The user access data A stored on the storage device(s) 208 may be accessed by the computing device 202 to obtain the set of access events $A_{user}$ by identifying access events that correspond to the user (e.g., correspond to the identifier of the user). Obtaining the set of access events $A_{user}$ may comprise identifying the access events in the access data A which correspond to the user. The user access data A may be filtered with the user identifier to obtain the set of access events $A_{user}$. For example, the user access data A may be a relational database and the set of access events may be a table of access events that correspond to the user.

At step 406, the method 400 comprises obtaining a set of LPR events of a plurality of license plate numbers (LPNs). For example, a set of LPR events $P_{user}$ may be obtained based on the set of access events $A_{user}$. The LPR data P stored on the storage device(s) 208 may be accessed by the computing device 202 to obtain the set of LPR events $P_{user}$ by identifying LPR events that occur in a time window surrounding any access event in the set of access events $A_{user}$. In other words, each LPR event in the set of LPR events $P_{user}$ may occur in a time window surrounding any access event in the set of access events $A_{user}$. Alternatively, the set of LPR events may correspond to the LPR data P comprising a plurality of LPR events. While various embodiments and examples are described herein with reference to the set of LPR events $P_{user}$, it should be appreciated that the set of LPR events "$P_{user}$" may be interchanged with the set of LPR events "P" corresponding to the LPR data P in some embodiments.

The time window may be implemented with both a minimum time separation δ and a maximum time separation Δ in a similar manner to method 300. The time window may be applied prior to and/or after a given access event of the user. In other words, for a given access event at time $t_a$, LPR events around the time window $t_a-\Delta$ to $t_a-\delta$ and/or $t_a+\delta$ to $t_a+\Delta$ may be considered for the set of LPR events $P_{user}$. If the user access data A does not indicate that the access events are entry or exit events, the time window may correspond to $t_a-\Delta$ to $t_a-\delta$ and $t_a+\delta$ to $t_a+\Delta$. If the user access data A does indicate that the access events are entry or exit events, the time window may correspond to $t_a-\Delta$ to $t_a-\delta$ for entry user access events and $t_a+\delta$ to $t_a+\Delta$ for exit user access events. Furthermore, if the LPR data P also contains the type of access events (i.e., entrance events and exit events), then only exit LPR access events may be used for the time window around the exit user access events and only entrance LPR events may be used for the time window around the entrance user access events.

Each access event in the set $A_{user}$ has a timestamp indicating that the access event occurs at a given time $t_a$. The time window $t_a-\Delta$ to $t_a-\delta$ and/or $t_a+\delta$ to $t_a+\Delta$ may be determined for each access event in the set of access events $A_{user}$. Each LPR event in the set of LPR events $P_{user}$ has a timestamp to. Accordingly, obtaining the set of LPR events $P_{user}$ may comprise identifying the LPR events in the LPR data P that have timestamps to that occur in the time window $t_a-\Delta$ to $t_a-\delta$ and/or $t_a+\delta$ to $t_a+\Delta$ for each access event in the set of access events $A_{user}$. For example, the LPR data P may be a relational database, and for a given row that has an LPR event in the time window $t_a-\Delta$ to $t_a-\delta$ and/or $t_a+\delta$ to $t_a+\Delta$, a first field (not illustrated in FIG. 2) may be set (e.g., set to 1). The set of LPR events $P_{user}$ may be determined as all rows of the LPR data P that have the first field set.

In some embodiments, a list of LPNs $L_{LPNS}$ appearing in the set of LPR events $P_{user}$ is obtained. The list of LPNs $L_{LPNS}$ may be obtained at step 406 or at any other suitable time during the performance of the method 400. The set of LPR events $P_{user}$ may be traversed to the obtained the list of LPNs $L_{LPNS}$ by identifying all LPNs that uniquely appear in the set of LPR events $P_{user}$. The list of LPNs $L_{LPNS}$ may be determined by taking all rows of P for which the first field is set, and grouping the entries by the LPNs, and then generating the list $L_{LPNs}$ therefrom.

At step 407, in some embodiments, the method 400 comprises determining one or more associated events for each respective LPN from at least a subset of the plurality of LPNs identifiable in the set of LPR events. The associated event(s) may be determined for each LPN identifiable in the set of LPR events P or for a subset of LPNs from the set P. The associated event(s) may be determined for each LPN identifiable in the set of LPR events $P_{user}$ or for a subset of LPNs from the set $P_{user}$. The list of LPNs $L_{LPNS}$ may be processed to determine the one or more associated events for each respective LPN in the list $L_{LPNs}$. The one or more associated events for each respective LPN may be determined based on one or more LPR events in the set of LPR events $P_{user}$ for the respective LPN that occurs around the set of access events $A_{user}$. For example, for a respective LPN, each of the one or more associated events may correspond to a given LPR event in the set of LPR events $P_{user}$ for the respective LPN that occurs in the time window $t_a-\Delta$ to $t_a-\delta$ and/or $t_a+\delta$ to $t_a+\Delta$ of a corresponding access event of the user in the set of access events $A_{user}$. Determining the one or more associated events may comprise identifying the one or more associated events for each respective LPN. Identifying the one or more associated events for each respective LPN may occur as part of step 406, as the LPR data P may be processed at step 406 to identify LPR events for a respective LPN that occur in the time window surrounding access events in the set of access events $A_{user}$. Determining the one or more associated events may comprise determining an amount of the one or more associated events for each respective LPN. In other words, the number of the one or more associated events for each respective LPN may be determined. The number of the one or more associated events for each respective LPN may correspond to the number of one or more distinct associated LPR events. In other words, if a LPR event is associated to two access events of the same user, it may be considered once in determining the number of the one or more associated events.

At step 408, the method 400 comprises determining a confidence score for each respective LPN from at least a subset of the plurality of LPNs identifiable in the set of LPR events. The confidence score may be determined for each LPN identifiable in the set of LPR events P or for a subset of LPNs from the set P. The confidence score may be determined for each LPN identifiable in the set of LPR events $P_{user}$ or for a subset of LPNs from the set $P_{user}$. The list of LPNs $L_{LPNS}$ may be processed to calculate the confidence score for each respective LPN in the list $L_{LPNS}$. The confidence score for each respective LPN may be determined based on an association between LPR events for the respective LPN in the set of LPR events $P_{user}$ and at least some access events in the set of access events $A_{user}$. The association for the respective LPN may be a statistical correlation or may be one or more associated events for the respective LPN. The confidence score for each respective LPN may be determined based on a statistical correlation between LPR events for the respective LPN in the set of LPR events $P_{user}$ and at least some access events in the set of access events $A_{user}$. The confidence score for each respective LPN may be determined based on the one or more associated events for the respective LPN. In some embodiments, step 407 may occur as part of step 408. That is, the one or more associated events for the respective LPN may be determined as part of determining the confidence score for the respective LPN. The confidence score for each respective LPN may be determined based on an amount of the one or more associated events for the respective LPN. The confidence score may be determined for each respective LPN based on one or more time differences between the one or more associated events for the respective LPN. The confidence score may be determined based on the amount of the one or more associated events and the time differences between the one or more associated events.

At step 410, the method 400 comprises identifying at least one candidate LPN for the user based at least in part on the confidence score for the at least one candidate LPN. The confidence scores of the LPNs may be filtered and/or sorted. For example, one or more LPNs in the list of LPNs $L_{LPNS}$ may be removed as candidates. Accordingly, if the number of associated events for a respective LPN is below a threshold minfreq, that LPN and corresponding confidence score may be disregarded. The confidence scores may be sorted from highest to lowest score. In some embodiments, the candidate LPN identified at step 410 is the LPN having the highest confidence score. In some embodiments, the candidate LPN identified at step 410 are a defined number of LPNs having the highest N number of confidence scores. In some embodiments, the candidate LPNs identified at step 406 are the LPNs having a confidence score above a threshold T. In some embodiments, the user may be associated with more than one vehicle (e.g., two vehicles) and identifying the candidate LPNs may comprise identifying that the user may be associated with more than one vehicle and providing the candidate LPN for each vehicle.

At step 412, the method 400 comprises outputting an indication that the at least one candidate LPN is a candidate for the user. The computing device 202 may output the indication for presentation on the display device 204. The indication may be a result listing. The result listing may comprise the candidate LPN(s) and the corresponding confidence score(s). The result listing may comprise a best candidate LPN of the plurality of LPNs, which may be the candidate LPN with the highest confidence score. The result listing may comprise best candidate LPNs which may be top the candidates LPNs with the highest confidence scores. The indication may be one or more plots and/or graphs. The indication may comprise any suitable information pertaining to the candidate LPN.

Figure 10B:
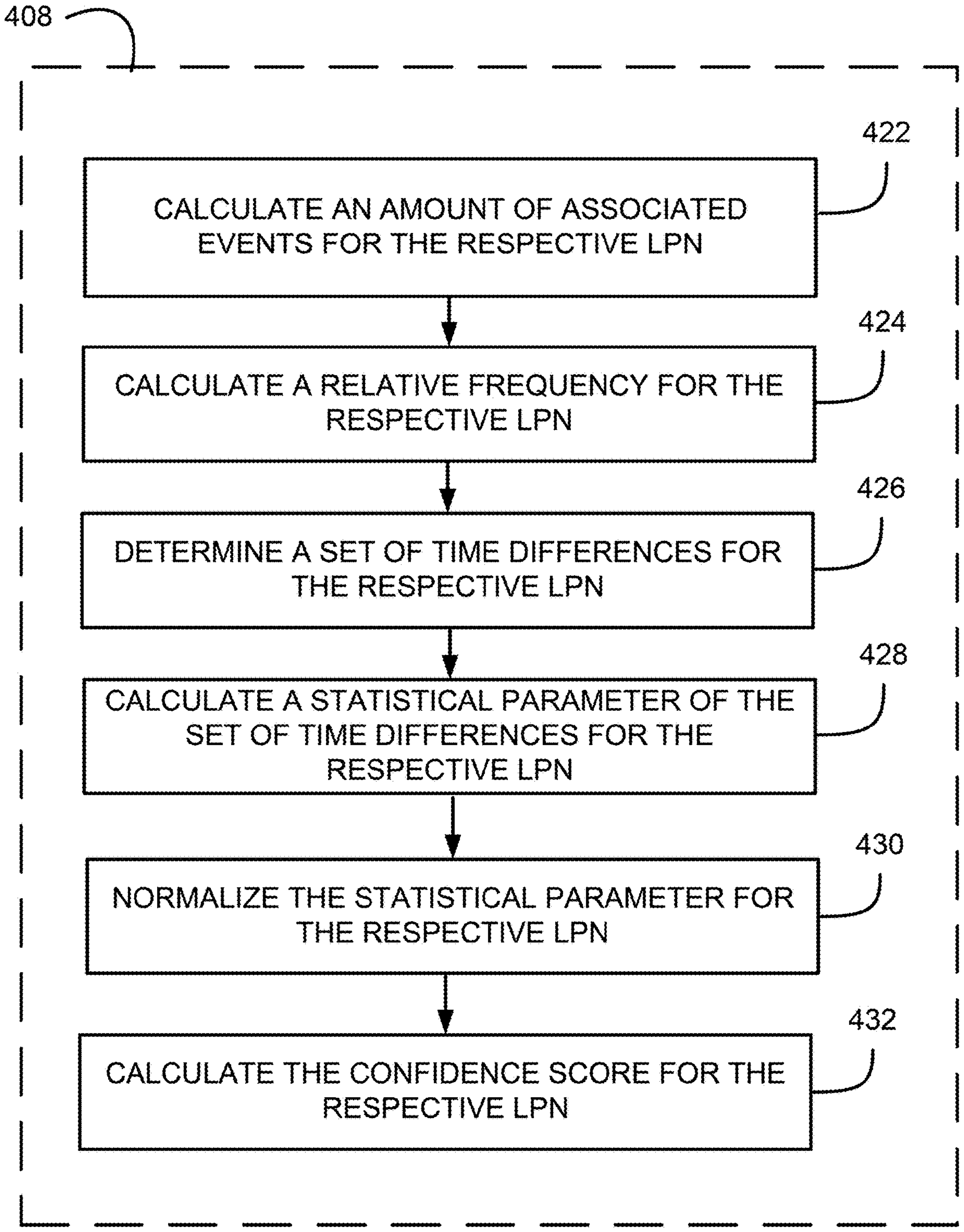
FIG. 10B is flowchart illustrating an example embodiment for calculating the confidence score for the at least one candidate license plate number, in accordance with one or more embodiments.

With additional reference to FIG. 10B, an example embodiment of step 408 of FIG. 10A is illustrated. Step 408 illustrated in FIG. 10B may be repeated for each respective LPN of the plurality of LPNs and is described with reference to a given respective LPN of the plurality of LPNs. At step 422, in some embodiments, the amount of associated events for the respective LPN is calculated. In other words, the number of LPR events in the set of LPR events $P_{user}$ for the respective LPN that occur in the time window of any access event in the set of access events $A_{user}$ is determined. Continuing with the example discussed above at step 406, the amount of associated events may be determined as a sum of the first field of the LPR data P. In some embodiments, the amount of the associated events may be been determined elsewhere in the method 400.

At step 424, in some embodiments, a relative frequency for the respective LPN is calculated. The relative frequency may be calculated by dividing the amount of associated events (e.g., as determined at step 422) for the respective LPN by the total number of LPN events in the set of LPR events $P_{user}$ that correspond to the respective LPN. The total number of LPN events in the set of LPR events $P_{user}$ corresponds to the total number of LPN events for the respective LPN. The relative frequency is indicative of a percentage of LPR events for the respective LPN that occur in the time window of any access event for the user. The relative frequency may be multiplied by one hundred (100) to represent the value as a percentage.

At step 426, in some embodiments, a set of time differences G for the respective LPN is determined. The set of time differences corresponds to one or more time differences between the one or more associated events for the respective LPN. In other words, the set of time differences G corresponds to one or more time differences between each LPR event in the set of LPR events $P_{user}$ for the respective LPN that occurs in the time window of at least one corresponding access event of the user and the at least one corresponding access event of the user. More specifically, each time difference in the set of time differences G is a difference in time between a given LPR event in the set of LPR events $P_{user}$ for the respective LPN that occurs at time $t_p$ and a given access event in the set of access events $A_{user}$ for the user that occurs at time $t_a$, where the time $t_p$ that the given LPR events occurs is within the time window $t_a-\Delta$ to $t_a-\delta$ and/or $t_a+\delta$ to $t_a+\Delta$.

At step 428, in some embodiments, a statistical parameter of the set of time differences G for the respective user is calculated. The statistical parameter may be calculated, for example, as described at step 328.

At step 430, in some embodiments, the statistical parameter of step 428 may be normalized. The statistical parameter may be normalized, for example, as described at step 330.

At step 432, in some embodiments, the confidence score for the respective LPN is calculated. The confidence score may be calculated in various manners depending on practical applications. In some embodiments, the confidence score for the respective LPN is calculated based on the amount of associated events for the respective LPN. For example, the confidence score for the respective LPN may be the amount of associated events for the respective LPN. In some embodiments, the confidence score for the respective LPN is calculated based on the relative frequency for the respective LPN determined at step 424. For example, the confidence score for the respective LPN may be the relative frequency for the respective user. In some embodiments, the confidence score for the respective LPN is calculated based on the set of time differences for the respective LPN determine at step 426. In some embodiments, the confidence score for the respective LPN is calculated based on the statistical parameter (e.g., variance) for the respective LPN determined at step 428. The statistical parameter for the respective LPN used to determine the confidence score may be a weighted average and/or may be normalized. For example, confidence score for the respective LPN may be the statistical parameter (e.g., variance) for the respective LPN (e.g., the normalized weighted average of the variance). In some embodiments, the confidence score for the respective LPN is determined as the product of the relative frequency for the respective LPN and the statistical parameter (e.g., variance) for the respective LPN. The confidence score for the respective LPN may be calculated as:

$$\text{confidence score} = \frac{\alpha \cdot freq}{(\text{var} + \alpha)}$$

where freq is the relative frequency for the respective LPN and var is the variance for the respective LPN. The confidence score may be calculated in a similar manner using any other suitable statistical parameter.

The confidence score for each respective LPN may be determined in any other suitable manner and FIG. 10B is only one example illustrating various embodiments that may be used to determine the confidence score. The confidence score for the respective LPN may be determined based on a statistical correlation between LPR events for the respective LPN in the set of LPR events $L_{user}$ (or L) and at least some access events in the set of access events $A_{user}$. The statistical correlation may correspond to the statistical parameter noted elsewhere in this documents. Any suitable statistical parameter may be determined in order to determine the confidence score. The statistical correlation may be determined as per one or more of the embodiments of FIG. 10B. The confidence score for the respective LPN may be determined based on a statistical correlation between the associated events for the respective LPN. The confidence score for the respective LPN may be determined by calculating the confidence score based on proximity in time between the LPR events for the respective LPN in the set of LPR events $P_{user}$ (or P) and at least some access events in the set of access events $A_{user}$. The proximity in time between events may correspond to the time differences between associated events. Accordingly, the confidence score may be determined based on the time differences between associated events for the respective LPN. The confidence score for the respective LPN may be determined by calculating the confidence score based on a measure of variability between the LPR events for the respective LPN in the set of LPR events $P_{user}$ (or P) and the access events in the set of access events $A_{user}$. The measure of variability may be any suitable statistical parameter indicative of variability of the time differences between associated events for the respective LPN. The measure of variability may be variance, standard deviation, or any other suitable statistical parameter. Accordingly, the confidence score may be determined based on the variance (or the standard deviation) between LPR events for the respective LPN in the set of LPR events $P_{user}$ (or P) and at least some access events in the set of access events $A_{user}$. The set of access events $A_{user}$ and the set of LPR events $P_{user}$ (or P) may be applied to any suitable predetermined function and each of the respective LPN may be scored based on how well they fit the function. For example, the time differences may be assumed to follow a delta function and the goodness of fit may be estimated from the variance. By way of another example, the randomness of the events may be accounted for by assuming the time differences to follow a Gaussian distribution, and goodness of fit may be estimated from any kind of normality test.

Referring back to FIG. 10A, in some embodiments, at step 402, the query may comprise any one or more of the following parameters: the identifier of the user, the confidence score threshold T that a given confidence score is to exceed in order for the corresponding LPN to be considered a candidate, the threshold minfreq for the minimum number of associated events for a respective LPN in order for the respective LPN to be considered a candidate, the N number of highest confidence scores and corresponding candidate LPNs to consider, the minimum time separation δ, the maximum time separation Δ, the tolerance parameter a of the variance, the user access data A, the LPR data P, the radius of the connectivity graph and/or any other suitable information. Any of the aforementioned parameters may be preprogrammed and accordingly may be omitted from the query.

The candidate LPN(s) for the result listing that may be sorted and ordered in any suitable manner. For example, the candidate LPN(s) may be sorted by any of the relative frequency of the LPNs, the variance of the LPNs, the weighted average variance of the LPNs, the normalized variance of the LPNs, the amount of associated events of the LPNs, the confidence score of the LPNs.

Figure 11:
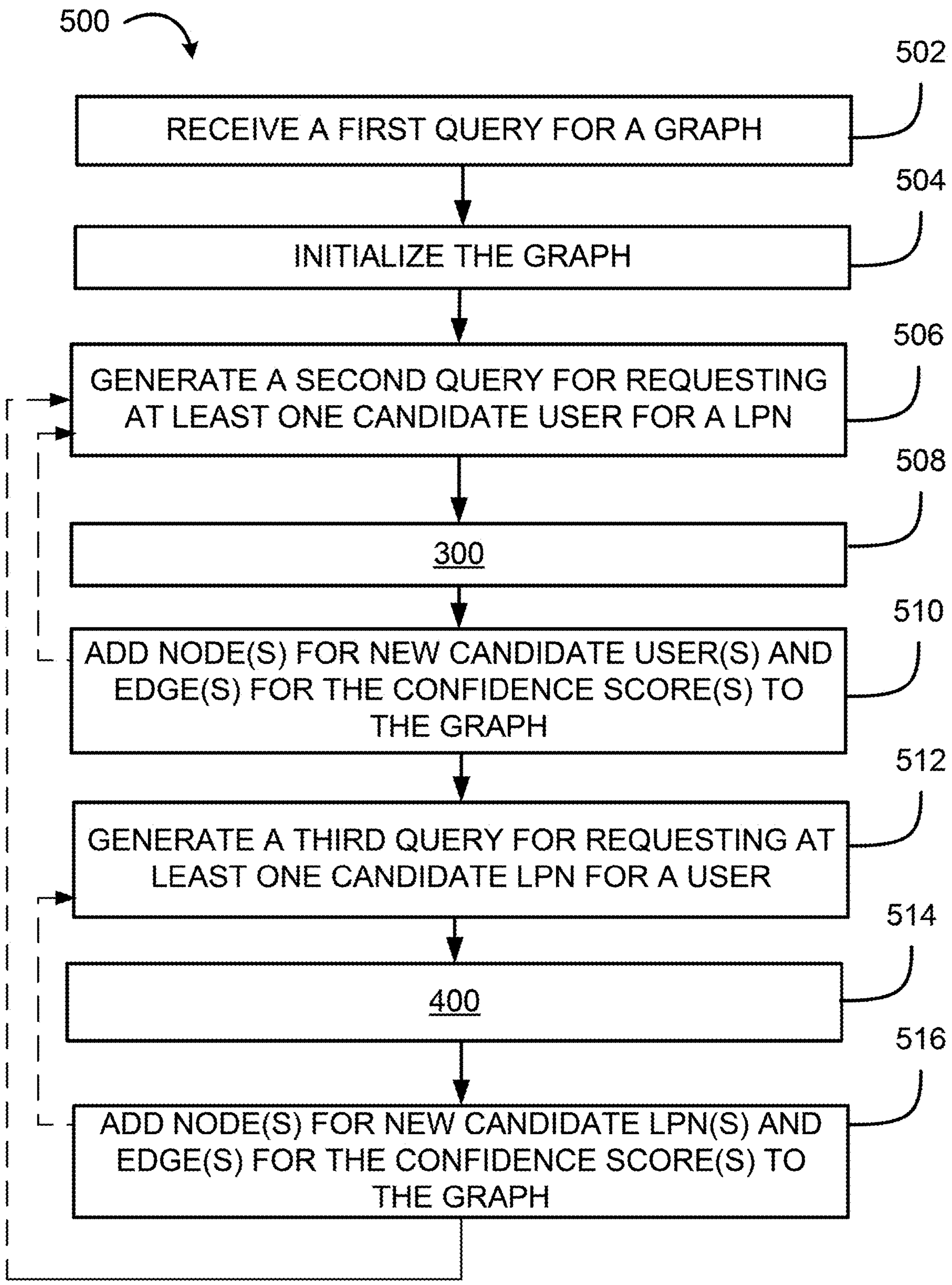
FIG. 11 is a flowchart illustrating an example method for generating a connectivity graph, in accordance with one or more embodiments.

In some embodiments, instead of doing an analysis to obtain a list of candidate LPNs/users for one user/LPN, an analysis may be performed to find the best candidates for those candidates as well. With reference to FIG. 11, a flow chart for a method 500 for generating a connectivity graph is illustrated. At step 502, a first query for generating a connectivity graph is received. The query may comprise any other suitable parameters. The query may comprise any of a LPN or an identifier of a user, the confidence score threshold T, the minimum number of associated events threshold minfreq, the N number of highest confidence scores and corresponding candidate to consider, the minimum time separation δ, the maximum time separation Δ, the tolerance parameter a of the variance, the user access data A, the LPR data P, the radius of the connectivity graph and/or any other suitable information.

The graph that is to be generated may be considered a bipartite graph and a matching of the graph consists of a subset of edges that no two edges is incident to the same node. The graph generated as part of method 500 may be similar to that illustrated in FIGS. 9A and 9B. For example, one set of nodes may be unique LPNs and the other set of nodes may be the unique identifiers of users. Two nodes (i.e., one from each of these sets of nodes) may be connected if one is a candidate for the other and the weight of the edges may be the confidence score associated to the match. The generated graph may be indicative of a maximal matching or a perfect matching. Maximal matching is one where the number of nodes in the graph induced by the edges is maximal amongst all possible matching or, alternatively, in the case of weighted edges, it may be the matching for which the sum of the weight of the selected edges is maximal. However, a maximal matching would assume that every user is only associated with one car, which is typically not the case. A perfect matching is a matching for which all the nodes in the graph are induced by the subset of edges.

At step 504, the graph is initialized. The graph may be initialized as an empty graph. If the first query at step 502 comprises the LPN, then a node for the LPN may be added to the graph. If the first query at step 502 comprises the identifier of the user, then a node for the identifier of the user may be added to the graph. A set of new LPNs and a set of new users may be initialized at step 504. The set of new LPNs and a set of new users may each be initialized as empty sets. If the first query at step 502 comprises the LPN, then the LPN may be added to the set of new LPNs. If the first query at step 502 comprises the identifier of the user, then the identifier of the user may be added to the set of new users.

At step 506 a second query is generated. If the first query at step 502 comprises the LPN, then the second query may be generated with the LPN; otherwise, the method 500 may proceed to step 512. The second query generated at step 506 is for requesting that at least one candidate user for a provided LPN be determined. The second query may comprise any suitable parameters from the first query at step 502. A second query may be generated for each LPN in the set of new LPNs.

At step 508, the method 300 is performed for the second query of step 506. The method 300 may output at least one candidate user for the provided LPN and the corresponding at least one confidence score. There may be cases where no access events are recorded in the time window around the LPR events for the provided LPN, and in this case there would be no possible candidate to output. Accordingly, the output of method 300 may be an indication that there is no candidate user for the provided LPN. Candidate user(s) with a confidence score below the confidence score threshold T may be removed. All the candidate user(s) not previously in the graph (i.e., the new candidate user(s)) may be added to the set of users by adding the user's identifier to the set of users. If no new candidate user is determined at step 508, the method 500 may be stopped.

At step 510, the new candidate user(s) are added as nodes to the graph and the corresponding confidence score(s) are added to as edges to the graph. The nodes may be created based on the set of new users determined at step 508. After step 510, the method may proceed back to step 506 until all of the LPNs in the set of new LPNs have been processed.

At step 512, at least one third query is generated. The third query generated at step 512 is for requesting that at least one candidate LPN be determined for a provided identifier of a user. The third query may comprise any suitable parameters from the first query at step 502. A third query may be generated for each user identifier in the set of new user. The third query may not be generated and the method 500 may be stopped depending on the radius provided as part of the first query. That is, the group of steps 506, 508 and 510 and the second group of step 510, 512 and 514 may only be performed until the radius of the connectivity graph meets the radius provided as part of the first query.

At step 514, the method 400 is performed for the third query of step 512. The method 400 may output at least one candidate LPN for the provided identifier of a user and the corresponding at least one confidence score. There may be cases where no LPR events are recorded in the time window around the access events for the user corresponding to the provided identifier, and in this case there would be no possible candidate to output. Accordingly, the output of method 400 may be an indication that there is no candidate LPN for the provided identifier of the user. Candidate LPN(s) with a confidence score below the confidence score threshold T may be removed. All the candidate LPN(s) not previously in the graph (i.e., the new candidate LPN(s)) may be added to the set of new LPNs. If no new candidate LPN is determined at step 514, the method 500 may be stopped.

At step 516, the new candidate LPN(s) are added as nodes to the graph and the corresponding confidence score(s) are added to as edges to the graph. The confidence score may be symmetric (i.e., the same score would be determined whether the LPN or the user was used in the original query) and any new edge added to the graph at this step may always be incident to the newly added nodes and the previous added nodes. Accordingly, they may be no query needed for nodes appearing in the graph before the previous step. The nodes may be created based on the set of new LPNs determined at step 514. After step 516, the method may proceed back to step 512 until all of the identifier in the set of new user have been processed.

After step 516, the method 500 may return to step 506, depending on the radius provided as part of the first query. Accordingly, the group of steps 506, 508 and 510 and/or the second group of step 510, 512 and 514 may be repeated until the radius of the connectivity graph meets the radius provided as part of the first query.

The methods and system described herein may be used to identify a vehicle that is not associated with a user. For example, this may be used by a company to detect when a vehicle in the parking lot is not of an employee.

In some embodiments, the user access data A and/or the LPR data P only comprises unique events, in the sense that a same LPR event and/or access event is not recorded several times. In some embodiments, the user access data A and/or the LPR data P may be preprocessed to remove or regroup any duplicate LPR events and/or access events. In some embodiments, only one of multiple events are kept when the events are redundant. In some embodiments, any two events (e.g., any two LPR events of the same LPN or any two access events of the same user) that happen within a predefined time separation apart may be considered the same and are regrouped. The events may be regrouped by taking the average of the timestamps of duplicate events.

The specifics of the user access data A and/or the LPR data P may affect the performance of the methods and systems described herein. The methods and systems may have an improved performance when one or more of the follow occurs: the LPR data P corresponds to every LPR event at all entries and exits of a parking lot for a dataset time period, the user access data A corresponds to every access event at all entries and exits of the secured area for the dataset time period, the dataset time period is sufficiently long enough (e.g., at least one month's worth of data), the amount of tailgating for entry and exit to the secured area is minimal, the users follow a somewhat regular schedule, the users take roughly the same amount of time $t_p$ travel from the vehicle to the access point for a similar time of day, the users use the same vehicle throughout the dataset time period, there is no waiting time $t_p$ enter the secured area, there is no waiting to exit the parking lot, most of the time the users that enter the parking lot will then enter the secured area and users that exit the parking lot have previously exited the secured area, every user and license plate number to be matched is regularly present (e.g., every working day). The threshold minfreq for the minimum number of associated events may be set to at least 5, in some embodiments.

Figure 12:
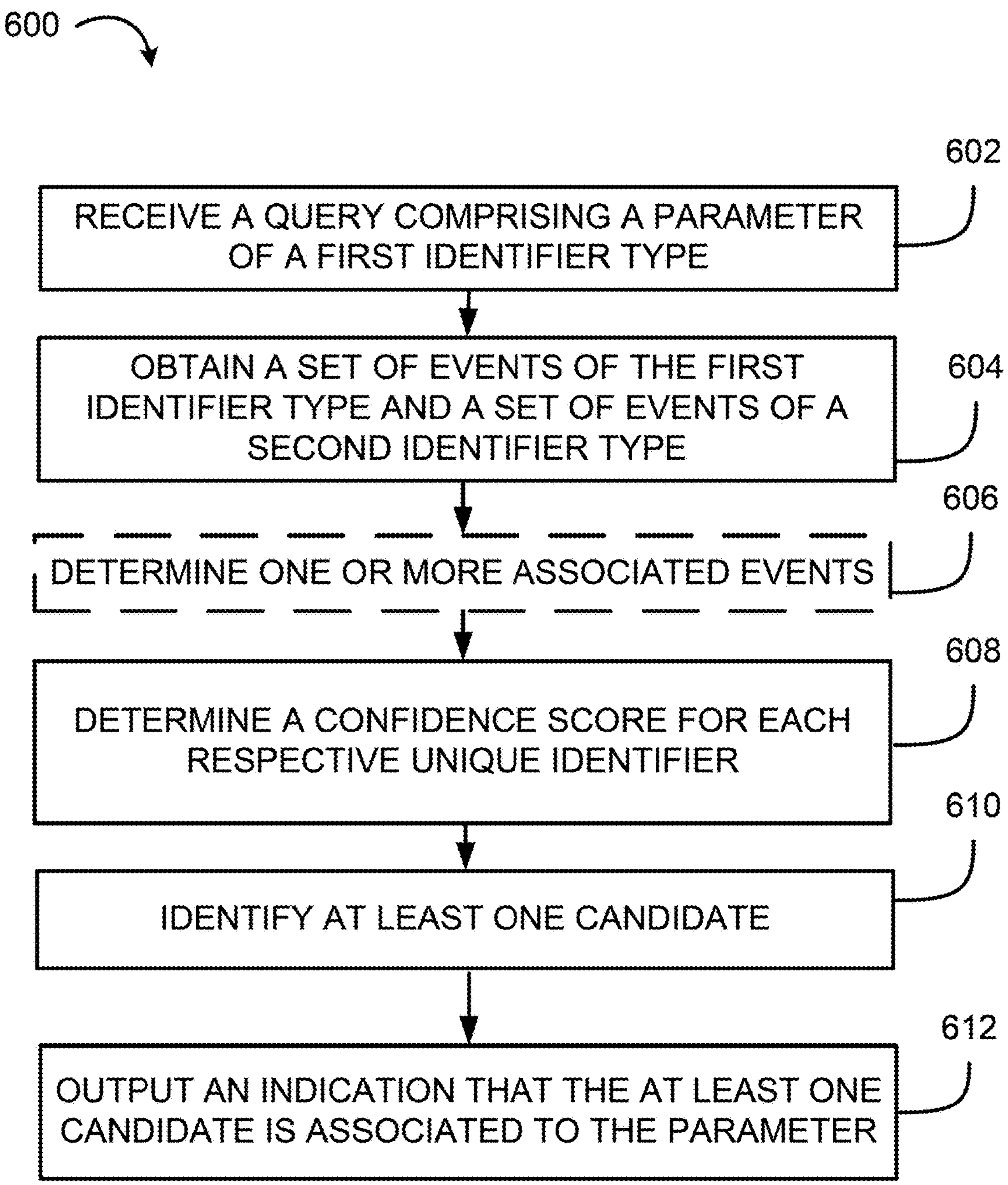
FIG. 12 is a flowchart illustrating an example method for determining at least one candidate for a parameter, in accordance with one or more embodiments.

While various embodiments are described herein with reference the user access data A and/or the LPR data P for matching a license plate number to one or more candidate users and for matching a user to one or more candidate license plates, the systems and/or methods described herein may be applicable to identification between two sets of any kind of identification data. With reference to FIG. 12, there is shown a flowchart illustrating an example computer-implemented method 600. The method 600 is performed at a computing device, such as computing device 202 of FIG. 3. The method 600 corresponds to a variant of the methods 300 and 400, which may be used for identification between two sets of any kind of identification data. Accordingly, one or more aspects of the methods 300 and/or 400 may be used to implement the method 600. At step 602, the method 600 comprises receiving a query comprising a parameter of a first identifier type for determining at least one candidate of a second identifier type. The query may be generated at the computing device 202, for example, as described elsewhere in this document. At step 604, the method 600 comprises obtaining a first set of events of the first identifier type based on the parameter and a second set of events of the second identifier type. At step 606, in some embodiments, the method 600 comprises determining one or more associated events for each respective identifier from at least a subset of a plurality of unique identifiers of the second set. The one or more associated events for each respective identifier may be determined based on one or more events in the second set of events for the respective identifier that occur around the first set of events. For example, each of the one or more associated events for the respective unique identifier may correspond to a given event in the first set that has a corresponding event in the second set that occurs in a time window of the given event. At step 608, the method 600 comprises determining a confidence score for each respective unique identifier. The confidence score for each respective user may be determined based on an association between events for the respective unique identifier in the second set of events and at least some events in the first set of events. The association for the respective user may be a statistical correlation or may be one or more associated events for the respective unique identifier. The confidence score for each respective unique identifier may be determined based on a statistical correlation between events for the respective unique identifier in the second set of events and at least some events in the first set of events. The statistical correlation may be determined in a similar manner as describe elsewhere in this document. The confidence score may be determined based on the one or more associated events for the respective unique identifier. In some embodiments, determining the confidence score comprises calculating a relative frequency for each unique identifier by dividing an amount of the one or more associated events for the respective unique identifier by a total number of events in the first set of events, and calculating the confidence score for each respective unique identifier based on the relative frequency for the unique identifier. In some embodiments, determining the confidence score comprises calculating determining a set of time differences between the one or more associated events for each respective unique identifier, and calculating the confidence score for each respective unique identifier based on the relative frequency for the respective unique identifier and the set of time differences for the respective unique identifier. In some embodiments, determining the confidence score comprises calculating a variance of the set of time differences for each respective unique identifier, and calculating the confidence score for each respective unique identifier based on the relative frequency for the respective unique identifier and the variance for the respective unique identifier. The variance may be a weighted average variance and/or may be normalized. The confidence score may be determined as the product of the relative frequency and the variance. At step 610, the method 600 comprises identifying at least one candidate for the parameter based on the confidence score. At step 612, the method 600 comprises outputting an indication that the at least one candidate is associated to the parameter for presentation on a display device. The method 600 may be use for matching between facial recognition at an entry and/or exit point and logging onto and/or off of a company network. Accordingly, the parameter of a first identifier type may be an image of a face, the first set of events of the first identifier type may be a set of images of faces captured with a timestamp and the second set of events of the second identifier type may be a set of login and/or logoff events with a timestamp occurring in a time window of any one of the events in the first set of events.

The methods 300, 400, 500 and/or 600 may be use for matching between LPR events and payment events. For example, the methods 300 and/or 400 may be modified by interchanging the user access events with payment events (e.g., payment information such as credit card numbers) in order to identify a user associated with certain payment event to a license plate number, or vice versa.

The methods 300, 400, 500 and/or 600 may be use for matching between LPR events and network login events. For example, the methods 300 and/or 400 may be modified by interchanging the user access events with user login events of a computer network in order to identify a user associated with a user login identifier as a candidate for a license plate number, or vice versa.

The methods 300, 400, 500 and/or 600 may be use for matching between LPR events and parking pass access events. For example, the methods 300 and/or 400 may be modified by interchanging the user access events of a building with user access events of a parking lot (e.g., scanning of a parking pass to gain access to a parking lot) in order to identify a user as a candidate for a license plate number, or vice versa.

Figure 13:
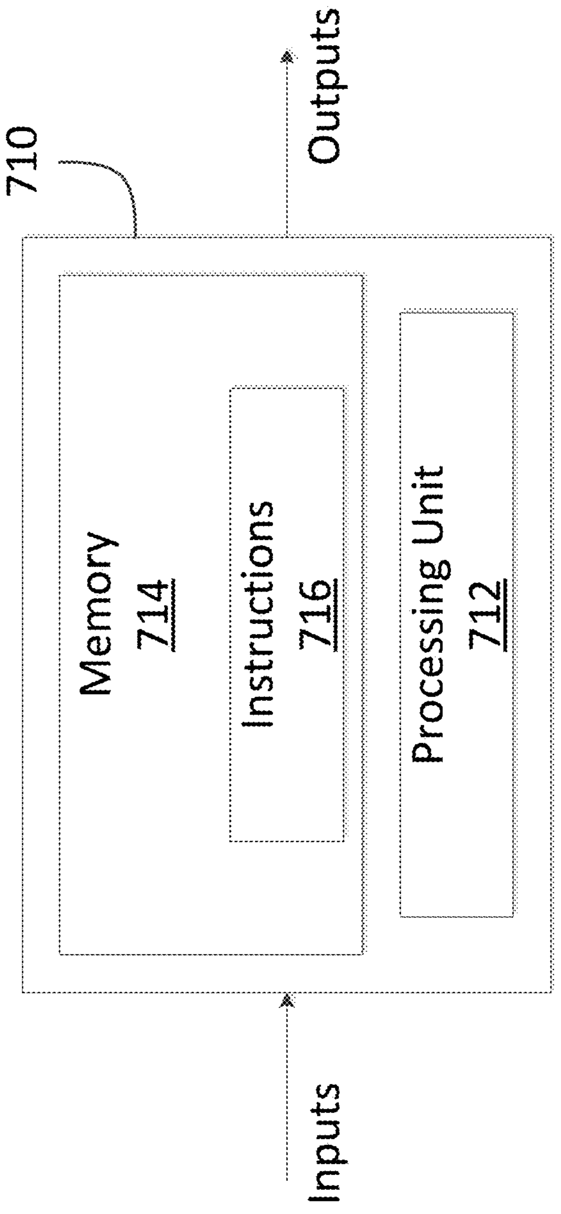
FIG. 13 is a schematic diagram of an example computing device, in accordance with one or more embodiments.

With reference to FIG. 13, the method(s) 300, 400, 500, and/or 600 may be implemented by a computing device 710, comprising a processing unit 712 and a memory 714 which has stored therein computer-executable instructions 716. The camera 102, the server(s) 104 and/or 114, the access control reader(s) 112, and/or the computing device 202 may each be implemented by and/or comprise a computing device, such as the computing device 710. The processing unit 712 may comprise any suitable devices configured to implement the method(s) 300, 400, 500, and/or 600 such that instructions 716, when executed by the computing device 710 or other programmable apparatus, may cause the functions/acts/steps performed as part of the method(s) 300, 400, 500, and/or 600 as described herein to be executed. The processing unit 712 may comprise, for example, any type of general-purpose microprocessor or microcontroller, a digital signal processing (DSP) processor, a central processing unit (CPU), a graphical processing unit (GPU), an integrated circuit, a field programmable gate array (FPGA), a reconfigurable processor, other suitably programmed or programmable logic circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 714 may comprise any storage means (e.g., devices) suitable for retrievably storing machine-readable instructions 716 executable by processing unit 712.

The methods and systems described herein may be implemented in a high level procedural or object oriented programming or scripting language, or a combination thereof, to communicate with or assist in the operation of a computer system, for example the computing device 710. Alternatively, the methods and systems may be implemented in assembly or machine language. The language may be a compiled or interpreted language. Program code for implementing the methods and systems may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems may also be considered to be implemented by way of a non-transitory computer-readable storage medium having a computer program stored thereon. The computer program may comprise computer-readable instructions which cause a computer, or in some embodiments the processing unit 712 of the computing device 710, to operate in a specific and predefined manner to perform the functions described herein.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the methods and systems described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be obvious to those skilled in the art that changes and modifications may be made without departing from this invention in its broader aspects. The scope of the following claims should not be limited by the embodiments set forth in the examples, but should be given the broadest reasonable interpretation consistent with the description as a whole.

What is claimed is:

1. A computer-implemented method for determining an association between a vehicle identifier and a user identifier, the computer-implemented method comprising:

obtaining, at a computing device, a first plurality of identification events comprising respective identifiers of a first type of identifier and a second plurality of identification events comprising respective identifiers of a second type of identifier different from the first type, the first type and second type of identifier selected from amongst vehicle identifiers and user identifiers, wherein identification events of the first plurality and of the second plurality of identification events occur at different moments in time;

for a particular identifier being of the first type of identifier, determining, from the first plurality of identification events, a set of first type identification events associated therewith, the set of first type identification events comprising a plurality of first type identification events each comprising the particular identifier;

determining, at the computing device and for each first type identification event of the set of first type identification events, a respective set of second type identification events from the second plurality of identification events based on occurrence of the second type identification events within a respective time window associated with each first type identification event, each second type identification event within a given set of second type identification events comprising a respective different second type identifier;

identifying, at the computing device, a correspondence of a number of second type identification events from multiple of the sets of second type identification events, each comprising a same particular second type identifier, with respective first type identification events from the set of first type identification events and matching, at the computing device, the particular second type identifier with the particular identifier of the first type of identifier based on said correspondence; and outputting, by the computing device via a graphical user interface (GUI) displayed on a display device, an indication that the particular second type identifier is a match for the particular identifier of the first type of identifier for presentation on the GUI.

2. The method of claim 1, wherein said matching the particular second type identifier to the particular identifier of the first type of identifier is further based on a respective confidence score determined for each of the second type identifiers.

3. The method of claim 2, comprising determining, at the computing device and for each second type identifier of each set of second type identification events, said respective confidence score, the confidence score indicative of a degree of correspondence between the each second type identifier and the particular identifier in the first type identification events of the set of first type identification events.

4. The method of claim 2, wherein said matching the particular second type identifier to the particular identifier of the first type identifier comprises comparing, for each first type identification event of the set of first type identification events, the respective confidence scores of the second type identifiers and determining the particular second type identifier based on said comparing.

5. The method of claim 1, wherein said matching the second type identifier to the particular identifier of the first type of identifier comprises determining a statistical parameter for each second type identifier based on a set of time differences between the first type identification events of the set of first type identification events and the second type identification events of each respective set of second type identification events.

6. The method of claim 5, wherein said determining the statistical parameter comprises determining one or more of one or more of a variance, a standard deviation, and a parameter indicative of a goodness of fit based on the set of time differences.

7. The method of claim 5, wherein determining the statistical parameter comprises determining a variance for each second type identifier as a weighted average over a plurality of periods of time of a day.

8. The method of claim 5, wherein the confidence score for each second type identifier is determined as a product of a relative frequency associated with the second type identifier and a variance associated with the second type identifier.

9. The method of claim 1, wherein determining the respective set of second type identification events for each first type identification event based on occurrence of the second type identification events with a respective time window associated with each first type identification event comprises determining those of the plurality of second type identification events which occur after a minimum delay after each first type identification event.

10. The method of claim 1, wherein determining the respective set of second type identification events for each first type identification event based on occurrence of the second type identification events with a respective time window associated with each first type identification event comprises determining those of the plurality of second type identification events which occur before a maximum delay after each first type identification event.

11. The method of claim 1, comprising determining, at the computing device, a travel time between a first location, associated with capture of the first plurality of identification events, and a second location, associated with capture of the second plurality of identification events, wherein the duration of the time window is based at least in part on the travel time.

12. The method of claim 11, comprising determining, at the computing device, a first waiting time associated with the first location and a second waiting time associated with the second location, wherein the duration of the time window is based on the first waiting time and/or the second waiting time.

13. The method of claim 1, comprising determining that the identification events of the first plurality of identification events are license plate read events and establishing respective license plate identifiers, and determining that the identification events of the second plurality of identification events are access control events and establishing access device identifiers.

14. The method of claim 13, wherein obtaining the first plurality of identification events comprises obtaining a plurality of license plate read events from a license plate reader.

15. The method of claim 14, wherein the license plate reader is situated at an entrance to a parking lot and produces an entrance feed, and obtaining, at the computing device, the plurality of license plate read events from the entrance feed.

16. The method of claim 13, wherein obtaining the second plurality of identification events comprises obtaining a plurality of access control events from an access device reader.

17. The method of claim 16, wherein the plurality of access control events are obtained from the access device reader situated at an access point of a building or campus.

18. The method of claim 1, wherein matching the particular second type identifier with the particular identifier selected one of the first type of identifier is based on the number of second type identification events comprising the same particular second type identifier being at least equivalent to a minimum threshold value.

19. The method of claim 1, comprising obtaining, via an input device, an indication of a selected identifier of the first type of identifier; and assigning, as the particular identifier, the selected identifier.

20. The method of claim 19, wherein the determining of the set of first type identification events, the determining of the respective set of second type identification events, and the identifying of the correspondence occurs responsive to the obtaining of the indication of the selected identifier.

21. A computer system for determining an association between a vehicle identifier and a user identifier, comprising:

a processor; and a non-transitory computer-readable memory storing instructions executable by the processor for:

obtaining, by the processor, a first plurality of identification events comprising respective identifiers of a first type of identifier and a second plurality of identification events comprising respective identifiers of a second type of identifier different from the first type, the first type and second type of identifier selected from amongst vehicle identifiers and user identifiers, wherein identification events of the first plurality and of the second plurality of identification events occur at different moments in time;

for a particular identifier being of the first type of identifier, determining, by the processor and from the first plurality of identification events, a set of first type identification events associated therewith, the set of first type identification events comprising a plurality of first type identification events each comprising the particular identifier;

determining, by the processor, for each first type identification event of the set of first type identification events, a respective set of second type identification events from the second plurality of identification events based on occurrence of the second type identification events within a respective time window associated with each first type identification event, each second type identification event within a given set of second type identification events comprising a respective different second type identifier;

identifying, by the processor, a correspondence of a number of second type identification events from multiple of the sets of second type identification events, each comprising a same particular second type identifier, with respective first type identification events from the set of first type identification events and matching the particular second type identifier with the particular identifier of the first type of identifier based on said correspondence; and outputting, by the processor and via a graphical user interface (GUI) displayed on a display device, an indication that the particular second type identifier is a match for the particular identifier of the first type of identifier for presentation on the GUI.

* * * * *